United States Patent
Igarashi et al.

[11] Patent Number: 5,806,482
[45] Date of Patent: Sep. 15, 1998

[54] IN-CYLINDER INJECTION INTERNAL COMBUSTION ENGINE

[75] Inventors: Kyoya Igarashi; Satoshi Yoshikawa; Kenji Goto; Takashi Kawabe; Katsunori Ueda; Nobuaki Murakami; Hideyuki Oda; Hiromitsu Ando, all of Tokyo, Japan

[73] Assignee: Mitsubishi Jidosha Kogyo Kabushiki Kaisha, Tokyo, Japan

[21] Appl. No.: 757,980

[22] Filed: Nov. 27, 1996

Related U.S. Application Data

[63] Continuation-in-part of PCT/JP96/00803, Mar. 27, 1996.

[51] Int. Cl.$^6$ .............................. F02B 17/00; F02B 23/08
[52] U.S. Cl. .................... 123/259; 123/260; 123/262; 123/276; 123/295; 123/305
[58] Field of Search ................... 123/259, 260, 123/261, 262, 276, 279, 305, 661, 295

[56] References Cited

U.S. PATENT DOCUMENTS

| | | | |
|---|---|---|---|
| 5,140,958 | 8/1992 | Kobayashi et al. | 123/276 |
| 5,170,759 | 12/1992 | Ito | 123/276 |
| 5,553,588 | 9/1996 | Gono et al. | 123/276 |

FOREIGN PATENT DOCUMENTS

| | | |
|---|---|---|
| 0412008A1 | 2/1991 | European Pat. Off. . |
| 6263122 | 3/1987 | Japan . |
| 62-178717 | 8/1987 | Japan . |
| 62-178718 | 8/1987 | Japan . |
| 62-169223 | 10/1987 | Japan . |
| 333448 | 2/1991 | Japan . |
| 352333 | 5/1991 | Japan . |
| 46534 | 1/1992 | Japan . |
| 458030 | 2/1992 | Japan . |
| 4-166612 | 6/1992 | Japan . |
| 4-228850 | 8/1992 | Japan . |
| 4224231 | 8/1992 | Japan . |
| 521132 | 3/1993 | Japan . |
| 565824 | 3/1993 | Japan . |
| 571350 | 3/1993 | Japan . |
| 579337 | 3/1993 | Japan . |
| 5202754 | 8/1993 | Japan . |
| 5-240045 | 9/1993 | Japan . |
| 5-240047 | 9/1993 | Japan . |
| 5-240051 | 9/1993 | Japan . |
| 5240044 | 9/1993 | Japan . |
| 681651 | 3/1994 | Japan . |
| 1560430 | 2/1980 | United Kingdom . |

*Primary Examiner*—Andrew M. Dolinar

[57] ABSTRACT

This invention relates to an in-cylinder injection internal combustion engine. A lower wall of a cylinder head, said lower wall defining an upper wall of a combustion chamber, is configured in the form of a pentroof composed of an intake-valve-side, tilted, lower wall and an exhaust-valve-side, tilted, lower wall. A spark plug is arranged in the vicinity of a top part of the pentroof-shaped upper wall of the combustion chamber. A top wall of a piston, said top wall forming a lower wall of the combustion chamber, is configured in the form of a pentroof having an intake-valve-side, tilted, top wall and an exhaust-valve-side, tilted, top wall formed so that they correspond the intake-valve-side, tilted, lower wall and the exhaust-valve-side, tilted, lower wall of the cylinder head. A recessed portion is arranged in the intake-valve-side, tilted, top wall in the top wall of the piston.

28 Claims, 35 Drawing Sheets

CAVITY VOLUME RATIO $$= \frac{\text{VOLUME OF SPACE OVER THE CAVITY}}{\text{VOLUME OF SPACE IN COMBUSTION CHAMBER}}$$

$$= \frac{V_a + V_b}{V_a + V_b + V_c}$$

a > b

F I G. 14
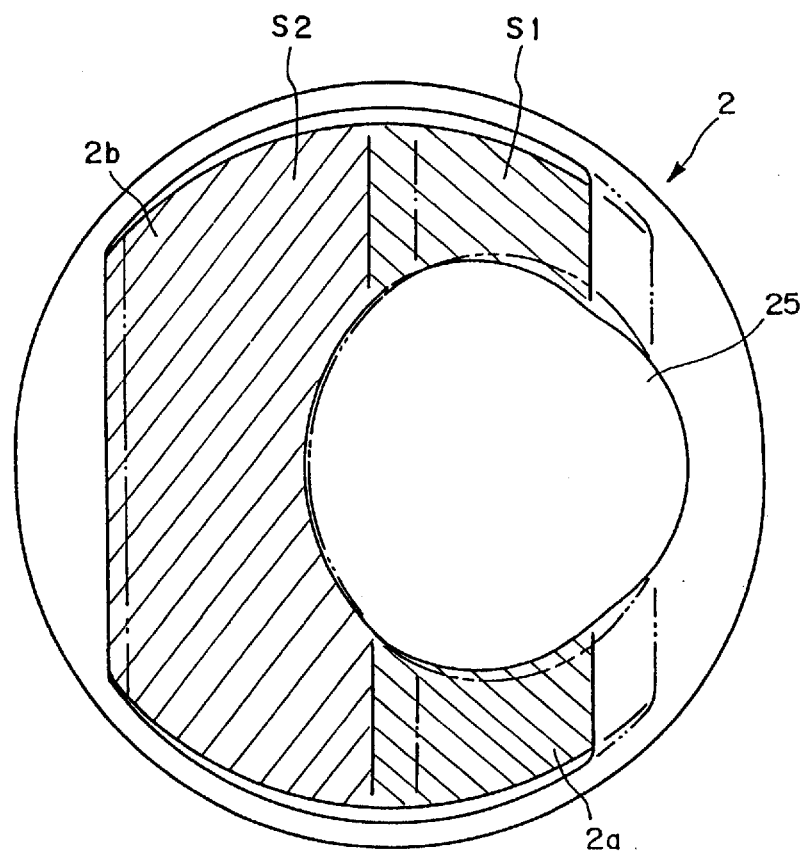

TOP PLAN VIEW

FRONT ELEVATIONAL VIEW

BOTTOM PLAN VIEW

LEFT SIDE ELEVATIONAL VIEW

RIGHT SIDE ELEVATIONAL VIEW

REAR ELEVATIONAL VIEW

CROSS-SECTIONAL VIEW TAKEN
IN THE DIRECTION OF ARROWS A-A

CROSS-SECTIONAL VIEW TAKEN
IN THE DIRECTION OF ARROWS B-B

TOP PLAN VIEW

FRONT ELEVATIONAL VIEW

BOTTOM PLAN VIEW

LEFT SIDE ELEVATIONAL VIEW

RIGHT SIDE ELEVATIONAL VIEW

REAR ELEVATIONAL VIEW

CROSS-SECTIONAL VIEW TAKEN
IN THE DIRECTION OF ARROWS A-A

CROSS-SECTIONAL VIEW TAKEN
IN THE DIRECTION OF ARROWS B-B

TOP PLAN VIEW

FRONT ELEVATIONAL VIEW

BOTTOM PLAN VIEW

LEFT SIDE ELEVATIONAL VIEW

RIGHT SIDE ELEVATIONA VIEW

REAR ELEVATIONAL VIEW

CROSS-SECTIONAL VIEW TAKEN
IN THE DIRECTION OF ARROWS A-A

CROSS-SECTIONAL VIEW TAKEN
IN THE DIRECTION OF ARROWS B-B

TOP PLAN VIEW

FRONT ELEVATIONAL VIEW

BOTTOM PLAN VIEW

LEFT SIDE ELEVATIONAL VIEW

RIGHT SIDE ELEVATIONAL VIEW

REAR ELEVATIONAL VIEW

CROSS-SECTIONAL VIEW TAKEN
IN THE DIRECTION OF ARROWS A-A

CROSS-SECTIONAL VIEW TAKEN
IN THE DIRECTION OF ARROWS B-B

TOP PLAN VIEW

FRONT ELEVATIONAL VIEW

BOTTOM PLAN VIEW

LEFT SIDE ELEVATIONAL VIEW

RIGHT SIDE ELEVATIONAL VIEW

REAR ELEVATIONAL VIEW

CROSS-SECTIONAL VIEW TAKEN
IN THE DIRECTION OF ARROWS A-A

CROSS-SECTIONAL VIEW TAKEN
IN THE DIRECTION OF ARROWS B-B

F I G. 56
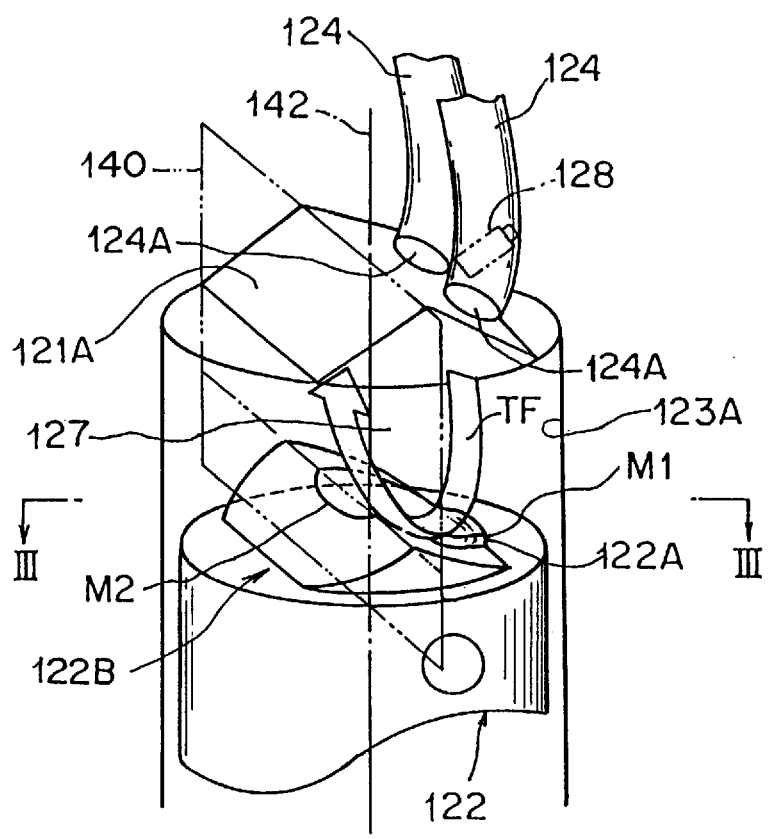

F I G. 59
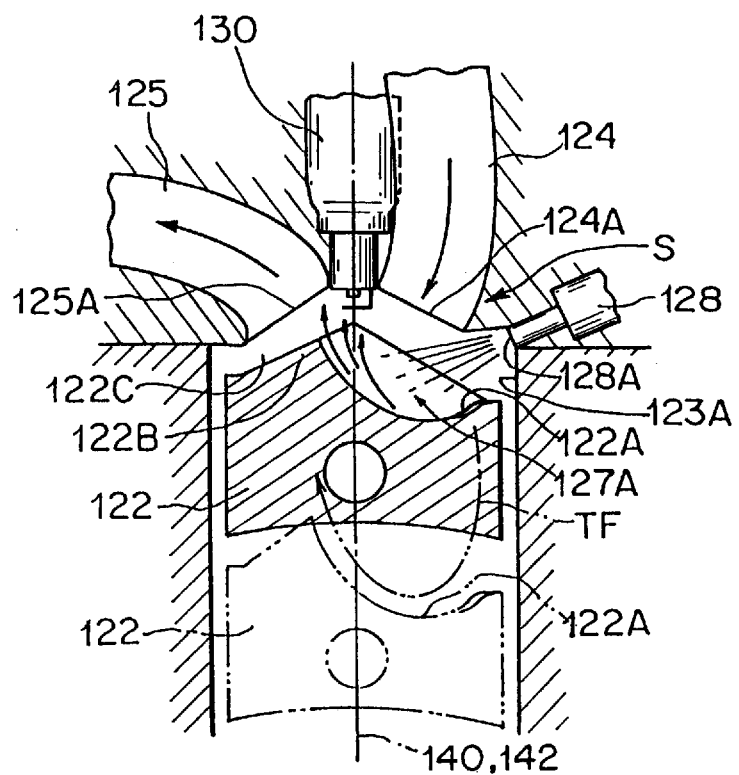

F I G. 62 (a)
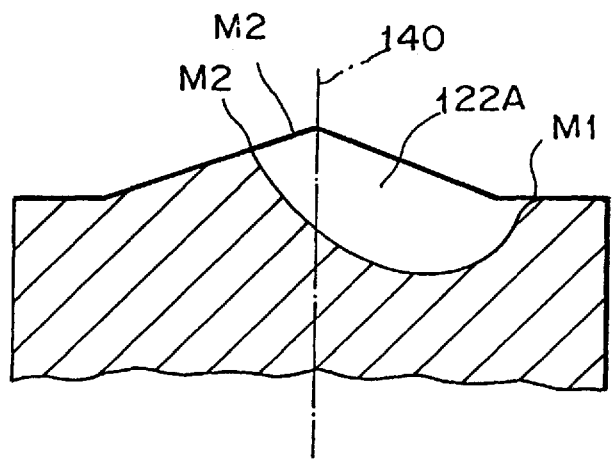
F I G. 62 (b)
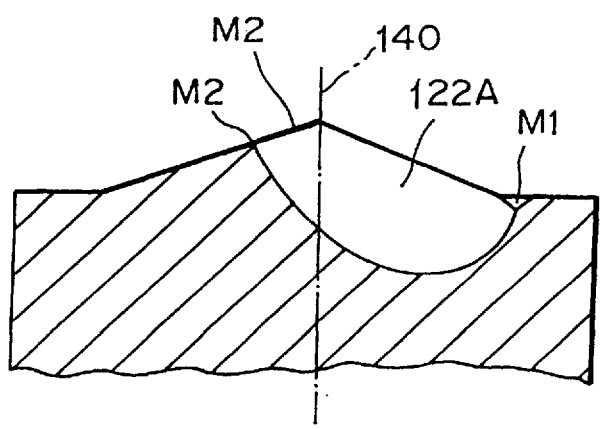

IN-CYLINDER INJECTION INTERNAL COMBUSTION ENGINE

This application is a continuation of PCT International Application No. PCT/JP96/00803 filed on Mar. 27, 1996 and amended Aug. 27, 1996 under Article 19(1) of the PCT, the entire contents of which are hereby incorporated by reference.

BACKGROUND OF THE INVENTION a) Field of the Invention

This invention relates to an in-cylinder injection internal combustion engine, which is of the spark ignition type and performs direct fuel injection into a combustion chamber.

b) Description of the Related Art

In fuel supply systems for gasoline engines, which primarily use gasoline as fuel, out of internal combustion engines, fuel injectors (injectors) have been employed widely for many years. In such gasoline engines, the operation of an injector is controlled by a control unit such as a controller to inject fuel in EL predetermined quantity at a predetermined timing into an intake port.

The fuel so injected into the intake port is then supplied into a combustion chamber together with air inducted in an intake stroke, whereby the fuel and the air are mixed and are ignited by a spark plug to burn.

On the other hand, in diesel engines which primarily employ diesel fuel or the like as fuel, fuel is directly injected into a combustion chamber and is caused to undergo autoignition by compressed air in the combustion chamber.

In the meantime, with a view to making an improvement in the response of such a gasoline engine by directly injecting fuel into its combustion chambers, internal combustion engines of the in-cylinder injection type have also been proposed.

In such an in-cylinder injection internal combustion engine, it is possible to perform combustion at an extremely low fuel concentration (i.e., at a high air/fuel ratio) as a whole, in other words, to conduct so-called stratified lean-burn operation by forming a swirl within each cylinder, injecting fuel into the swirl to form a layer of an air-fuel mixture of a desired concentration (a fuel concentration in the proximity of a stoichiometric air/fuel ratio) in positional registration with a spark plug and supplying the fuel in the layer of the air-fuel mixture to the spark. plug.

In such an in-cylinder injection internal combustion engine, knocking can be suppressed by injecting fuel from an early stage of an intake stroke upon burning the fuel in the form of an air-fuel mixture richer than that for stratified lean burning because air inducted in the combustion chamber is cooled by the fuel injected into the cylinder. As a result, there is the merit that the compression ratio can be increased more easily.

In an in-cylinder direction injection internal combustion engine, it is therefore important effectively design the shape of a combustion chamber formed by a piston, a lower wall of a cylinder head and the like for the better use of the above merit.

This has led to the problem that, when the shape of the combustion chamber becomes complex, the power output characteristics and gas mileage performance of the engine significantly vary even by a slightest design change in the shape or volume of the piston or combustion chamber, the position of the spark plug or the like.

Accordingly, there is an outstanding desire for the setting of a relative positional relationship between the shape of each combustion chamber in an in-cylinder injection internal combustion engine and parts of the combustion chamber so that the efficiency of combustion becomes optimal.

Incidentally, Japanese Patent Application Laid-Open (Kokai) No. HEI 4-228850 discloses a technique for preventing fuel, which has been injected from a fuel injection valve, from contacting an inner wall of a cylinder. Such a technique is however concerned only with the direction of injection of fuel from the fuel injection valve, and cannot solve the above-described problem.

Further, Japanese Patent Application Laid-Open (Kokai) No. HEI 4-58030 discloses a technique for reducing occurrence of self-ignition, knocking or smoke in an internal combustion engine of the in-cylinder injection type. However such a technique is merely to achieve smooth operation of an engine and again, cannot provide a solution to the above-described problem.

In addition, Japanese Patent Application Laid-Open (Kokai) No. HEI 4-166612 discloses a technique for improving ignition during low-load operation of an in-cylinder injection internal combustion engine. Such a technique does not involve formation of a combustion chamber and a piston or positional limitation to the arrangement of a spark plug for the achievement of an optimal combustion efficiency.

Techniques such as those described above are all directed to 2-cycle in-cylinder injection internal combustion engines. In the technique disclosed, for example, in Japanese Patent Application Laid-Open (Kokai) No. HEI 4-228850, as is illustrated in FIG. 63 and FIG. 64, an inner wall portion 103$b$ of a cylinder head is formed on one side of a lower wall 103$a$ of the cylinder head, and a pair of intake valves 106 are arranged there. Further, an inner wall portion 103$c$ of the cylinder head is on an opposite side of the lower wall 103$a$ of the cylinder head, and a pair of exhaust valves 107 are disposed there. These inner wall portions 103$b$ and 103$c$ of the cylinder head are connected to each other via a peripheral wall 108 depicted in FIG. 64, so that the whole inner wall portion 103$c$ of the cylinder head on the side of the exhaust valves 107 extends more into a combustion chamber 104 than the inner wall portion 103$b$ of the cylinder head.

This peripheral wall 108 is formed of a pair of masking walls 108$a$ disposed extremely close to peripheral edge portions of the intake valves 106 and extending in the form of circular arcs along the peripheral edge portions of the intake valves 106, a pair of fresh air guide walls 108$b$ located between the two intake valves 106,106, and a pair of fresh air guide walls 108$c$ located between portions of the peripheral wall of the inner wall 103$a$ of the cylinder head, said portions being adjacent to the peripheral wall, and their corresponding intake valves 106.

When the intake valves 106 are driven to open, air is allowed to flow into the combustion chamber 104 through the intake valves 106. At this time, the openings of the intake valves 106 are covered on the side of the exhaust valves 107 because of the existence of the masking walls 108$a$. Air therefore flows into the combustion chamber 104 through openings on sides opposite to the masking walls 108$a$, descends along an inner wall of a cylinder bore located below the intake valves 106, and then ascends along an inner wall of a scavenging cylinder bore located below the exhaust valves 107. By the loop-like flow so formed, scavenging effects are enhanced. Although a recessed portion 116 is formed in a top wall of a piston 102, said top wall being of a trapezoidal shape in cross-section, in the above-described in-cylinder injection internal combustion engine, a large space is formed between the inner wall portion 103b of the cylinder head and the top wall of the piston 102, leading to the problem that no sufficient compression ratio can be obtained from a combustion chamber of such a shape, thereby making it difficult to furnish engines of higher output.

In FIG. 63 and FIG. 64, there are also illustrated an intake port 112, an exhaust port 113, and injectors 114,115 arranged in the intake ports 112,112, respectively.

On the other hand, Japanese Patent Application Laid-Open (Kokai) No. HEI 5-71350 and Japanese Patent Application Laid-Open (Kokai) No. HEI 5-240051 each discloses an in-cylinder injection internal combustion engine in which a lower wall of a cylinder head is formed in a conical shape and a top wall of a piston is also formed in a conical shape so that they correspond to each other.

However, upon providing four valves with a view to permitting production of a high power output in response to a high load such as that required at the time of an acceleration or the like, limitations are imposed on a valve drive mechanism, for example, if the valves are arranged along a conical lower wall of a cylinder head. If the valves are arranged at right angles relative to the conical lower wall of the cylinder head, valve elements jut out into the combustion chamber or to prevent them from jutting out, it becomes necessary to form recesses in the lower wall of the cylinder head. Whichever the case may be, it is difficult to achieve high compression.

SUMMARY OF THE INVENTION

The present invention has been completed to meet the above-described demand and problem. An object of the present invention is to provide an in-cylinder injection internal combustion engine, in which the shape of each combustion chamber and the relative positional relationship between parts of the combustion chamber are set to achieve an optimal combustion efficiency and hence to attain improvements in both gas mileage and power output.

An in-cylinder injection internal combustion engine according to the present invention is provided with a combustion chamber formed with a top and a bottom thereof defined by a lower wall of a cylinder head and a top wall of a piston fittedly inserted within a cylinder, an intake valve arranged on one side of a lower wall of said cylinder head of said combustion chamber, an exhaust valve arranged on an opposite side of said lower wall of said cylinder head of said combustion chamber, an intake passage communicating at a lower end thereof to said combustion chamber through said intake valve so that inducted air is fed into said combustion chamber, an exhaust passage communicating at a lower end thereof to said combustion chamber through said exhaust valve so that combustion gas in said combustion chamber is exhausted, and a fuel injection valve arranged for directly injecting fuel into said combustion chamber, and is characterized in that said lower wall of said cylinder head, said lower wall forming an upper wall of said combustion chamber, is configured in the form of a pentroof which is composed of an intake-valve-side, tilted, lower wall formed on said, one side and an exhaust-valve-side, tilted, lower wall formed on said opposite side, a spark plug is arranged in the vicinity of a top portion of said pentroof-shaped upper wall of said combustion chamber, said top wall of said piston, said top wall forming a lower wall of said combustion chamber, is configured in the form of the pentroof having an intake-valve, tilted, top wall and an exhaust-valve, tilted, top wall, which are formed corresponding to said intake-valve-side, tilted, lower wall and said exhaust-valve-side, tilted, lower wall, respectively, and said intake-valve-side, tilted, top wall of said top wall of said piston is provided with a recessed portion. It is therefore possible to realize an in-cylinder injection internal combustion engine of a high compression ratio and hence to significantly improve the power output. In other words, because the ratio of the volume of the recessed portion of the piston to the volume of the whole combustion chamber can be set large, the compression ratio can be set high so that the engine can be constructed as a high power-output engine.

In the above-described in-cylinder injection internal combustion engine, said fuel injection valve may be arranged so that, when said piston is located in the vicinity of a top dead center, injected fuel can be directed toward an inside of said recessed portion. According to such a construction, the concentration of fuel in the recessed portion can be assured to be at a high level at the time of ignition.

Further, a ridge dividing said intake-valve-side, tilted, top wall and said exhaust-valve-side, tilted, top wall from each other may be formed on said top wall of said piston. As an alternative, said recessed portion may be formed extending from said intake-valve-side, titled, top wall to said exhaust-valve-side, tilted, top wall beyond said ridge. When constructed in this manner, the combustion chamber is in such a shape as corresponding to the intake-valve-side, tilted, top wall and the exhaust-valve-side, tilted, top wall on the side of the intake valve and on the side of the exhaust valve, respectively. The roles of the combustion chamber can therefore be assigned separately to the side of the intake valve and to the side of the exhaust valve. According to the alternative, the setting of the ratio of the volume of the recessed portion in the combustion chamber to the volume of the entire combustion chamber at an optimal value is facilitated, and both a high gas mileage and a high power output can be achieved.

Preferably, said recessed portion may be formed so that a cross-sectional shape thereof along a flowing direction of a flow of inducted air introduced into said combustion chamber can be formed in a circular arc. By this construction, the formation of a swirl, namely, a tumble flow by a flow of inducted air in the combustion chamber can be promoted to facilitate stratified combustion. In addition, said recessed portion is in the form of a spherical surface. When constructed in this manner, the surface area of the recessed portion of the piston can be minimized relative to the volume of the recessed portion. Further, this has the advantage that the heat loss can be reduced and the combustion efficiency can be improved. Moreover, the formation of the recessed portion in the spherical shape further facilitates the formation of a swirl, namely, a tumble flow by a flow of inducted air in the combustion chamber, thereby making it easier to perform stratified combustion.

It is also possible to construct the in-cylinder injection internal combustion engine in such a way that said piston has a planar portion, which is formed flat, on said top wall of said piston at least at an outer peripheral portion on the side of said intake valve and said recessed portion is formed of a flow-in portion formed gently descending from said planar portion so that a flow of inducted air, which has been introduced into said combustion chamber, flows into said recessed portion, a raised portion rising smoothly to guide the flow of inducted air, which has flowed into said recessed portion, from an inside of said recessed portion toward a vicinity of said spark plug, and a connecting portion smoothly connected to said flow-in portion and said raised portion and formed as a substantially planar surface. When constructed as described above, it is also possible to surely form a tumble flow in the combustion chamber.

In addition, said recessed portion can be formed of said intake-valve-side, tilted, top wall of said top wall of said piston, two spherical surfaces with centers thereof offset from each other, and a connecting surface smoothly connecting said two spherical surfaces. According to such a construction, the surface area of the recessed portion can be formed relatively small while forming the recessed portion with a large volume and the gas mileage can be improved without substantially reducing the power output characteristics.

In addition to such a construction, said centers of said two spherical surfaces can be arranged at positions so that in a top plan view of said piston, said centers can be offset relative to a plane, which extends at a right angle relative to a direction of arrangement of a piston pin and passes through an axis of said piston, in directions away from said plane by the same distance. By constructing the in-cylinder injection internal combustion engine, the piston can be formed in a laterally symmetrical form. As a consequence, irregular combustion can be eliminated in the combustion engine and the burning state of fuel can be stabilized.

The recessed portion can be formed as a part of an imaginary spherical surface having a center thereof at a point above said piston on the side of said intake valve so that said ridge of said piston and a lower extremity of said intake-valve-side, tilted, top wall of said piston are included within said imaginary spherical surface. As a consequence, the spark plug can be easily arranged in the recessed portion and the formation of a tumble flow can be promoted.

In addition to such a construction, it is also possible to construct the in-cylinder injection internal combustion engine so that, when said piston is located near a top dead center, an injection nozzle of said fuel injection valve and a valve element of said intake valve are both included within said imaginary spherical surface. Further, it is also possible to construct in such a way that, when said piston is located near a top dead center, a ground electrode of said spark plug is included within said recess. When constructed as described above, a rich air-fuel mixture can be formed in the recessed portion, thereby making it possible to increase the efficiency of combustion.

Further, it is also possible to arrange said spark plug so that, when said piston is located at said top dead center, said ground electrode of said spark plug is located close to an inner surface of said recessed portion. This construction makes it possible to achieve both an improvement in gas mileage and an improvement in power output with a good balance therebetween.

The in-cylinder injection internal combustion engine can also be constructed so that said spark plug can be arranged with a central axis thereof being tilted relative to a central cylinder axis over a predetermined angle toward the side of said exhaust valve. This can realize such a layout as surely positioning the electrode of the spark plug within the recessed portion while avoiding an interference between the piston and the spark plug.

Preferably, the in-cylinder injection internal combustion engine can also be constructed so that, when said piston is located at a top dead center, a clearance between said exhaust valve and said exhaust-valve-side, tilted, top wall of said piston at mutually closest portions thereof is set between 5 mm and 8 mm. As a consequence, it is possible to allow fuel, which is injected toward the recessed portion, to remain in the recessed portion at the time of ignition so that stratification between inducted air and fuel can be promoted. This makes it possible to realize a combustion state of a high thermal efficiency and also to improve the maximum power output.

It is also preferred to construct in such a way that, when said piston is located at a top dead center, a clearance between said exhaust-valve-side, tilted, lower wall and said exhaust-valve-side, tilted, top wall of said piston in the vicinity of said exhaust valve is set smaller than a clearance between said intake-valve-side, tilted, lower wall and said intake-valve-side, tilted, top wall of said piston in the vicinity of said intake valve. According to such a construction, the surface in the combustion chamber can be reduced without substantially changing the volume ratio of the whole combustion chamber, so that the heat loss is reduced. Therefore, the combustion efficiency can be improved, and both a high power output and a high gas efficiency can be achieved at high levels.

Preferably, the in-cylinder injection internal combustion engine can be constructed so that said exhaust-valve-side, tilted, lower wall of said cylinder head and said exhaust-valve-side, tilted, top wall of said piston are formed with a distance therebetween becoming wider toward a center of said combustion chamber and at a top dead center of said piston, a flame-propagating space of substantially a wedge shape in cross-section is formed. Said intake-valve-side, tilted, top wall and said exhaust-valve-side, tilted, top wall of said piston can be formed at substantially the same inclination and said exhaust-valve-side, tilted, lower wall of said cylinder head can be set at an inclination greater than said exhaust-valve-side, tilted, top wall of said piston. Further, said intake-valve-side, tilted, lower wall and said exhaust-valve-side, tilted, lower wall of said cylinder head can also be formed at substantially the same inclination and said exhaust-valve-side, tilted, top wall of said piston is set at an inclination smaller than said exhaust-valve-side, tilted, lower wall of said cylinder head. According to these constructions, a flame is allowed to uniformly propagate in the combustion chamber to achieve uniform combustion without irregularity. There are also advantages that the volume of the exhaust-valve-side space of the-combustion chamber is not changed and the setting of the volume ratio of the recessed portion is not affected at all.

Of a volume of said combustion chamber when said piston is located at a top dead center, the ratio of a volume between an inner wall of said recessed portion and said lower wall of said cylinder head above said recessed portion to a total volume of said combustion chamber when said piston is located at said top dead center can be set preferably at 0.4 to 0.6. The ratio of the respective volumes in the combustion chamber can therefore be set at an optimal value, thereby making it possible to achieve both a high gas mileage and a high power output.

Further, it is also possible to construct said intake passage so that a flow of inducted air, which has been introduced into said combustion chamber through said intake valve, is formed as a longitudinal swirl directed toward said top wall of said piston. It is also possible to construct in such a way that said intake passage is arranged on one side of an imaginary plane, in which a central cylinder axis and a crankshaft axis extend, and is arranged extending vertically alongside said imaginary plane in said cylinder head. When constructed as described above, the formation of a longitudinal swirl in the combustion chamber can be promoted and the longitudinal swirl can also be enhanced. More stable stratified combustion can therefore be performed.

Further, the in-cylinder injection internal combustion engine can also be constructed so that in said exhaust-valveside, tilted, top wall of said top wall of said piston, grooves are formed adjacent said recessed portion to ensure provision of a space between said exhaust-valve-side, tilted, top wall and said exhaust valve. This makes it possible to ensure the provision of a sufficient clearance between the piston and the exhaust valve.

BRIEF DESCRIPTION OF THE DRAWINGS

FIG. 14 is a schematic plan view showing the shape of a piston in the in-cylinder injection internal combustion engine according to the fourth embodiment of the present invention.

FIG. 15 to FIG. 22 are drawings all showing in detail the shape of a piston in the in-cylinder injection internal combustion engine according to the first embodiment of the present invention, in which FIG. 21 is a 21—21 cross-section of FIG. 19 and FIG. 22 is a 22—22 cross-section of FIG. 16.

FIG. 23 to FIG. 30 are drawings all showing in detail a first modification of the shape of the piston in the in-cylinder injection internal combustion engine according to the first embodiment of the present invention, in which FIG. 29 is a 29—29 cross-section of FIG. 27 and FIG. 30 is a 30—30 cross-section of FIG. 24.

FIG. 31 to FIG. 38 are drawings all showing in detail a second modification of the shape of the piston in the in-cylinder injection internal combustion engine according to the first embodiment of the present invention, in which FIG. 37 is a 37—37 cross-section of FIG. 35 and FIG. 38 is a 38—38 cross-section of FIG. 32.

FIG. 39 to FIG. 46 are drawings all showing in detail a third modification of the shape of the piston in the in-cylinder injection internal combustion engine according to the first embodiment of the present invention, in which FIG. 45 is a 45—45 cross-section of FIG. 43 and FIG. 46 is a 46—46 cross-section of FIG. 40.

FIG. 47 to FIG. 54 are drawings all showing in detail the shape of a piston in an in-cylinder injection internal combustion engine according to a second embodiment of the present invention, in which FIG. 52 is 52—52 cross-section of FIG. 48 and FIG. 53 is a 53—53 cross-section of FIG. 51.

FIG. 56 is a schematic perspective view showing the overall construction of the interior in the in-cylinder injection internal combustion engine according to the fifth embodiment of the present invention.

FIG. 59 is an illustration showing induction of FIG. 55 in the in-cylinder injection internal combustion engine according to the fifth embodiment of the present invention.

FIG. 62(a) is an enlarged cross-sectional view taken along line 62—62 of FIG. 57 and is a cross-sectional view showing a case in which an inlet side of a recessed portion is a rounded portion M1.

FIG. 62(b) is an enlarged cross-sectional view taken along line 62—62 of FIG. 57 and is a cross-sectional view showing a case in which an inlet side of a recessed portion is a chamfered portion M1.

DETAILED DESCRIPTION OF THE INVENTION AND PREFERRED EMBODIMENTS

Figure 1:
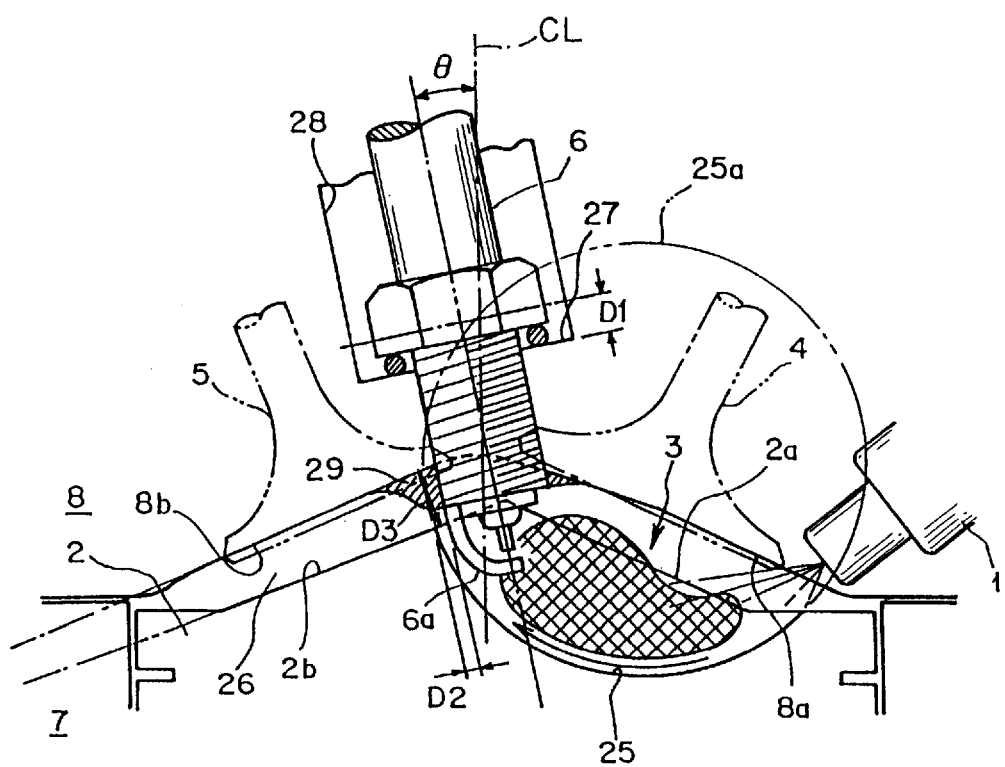
FIG. 1 is a schematic cross-sectional view showing the construction of a combustion chamber in an in-cylinder injection internal combustion engine according to a first embodiment of the present invention.

Embodiments of the present invention will hereinafter be described with reference to the drawings.

(a) Description of the first embodiment

The in-cylinder injection internal combustion engine according to the first embodiment of the present invention will first be described. As is illustrated in FIG. 1, a combustion chamber 3 of this engine is formed by a lower wall of a cylinder head 8 and a top wall of a piston 2, and an intake valve 4 is arranged in an upper wall of the combustion chamber 3 on one side thereof while an exhaust valve 5 is disposed on an opposite side.

On the lower wall of the cylinder head 8, that is, the upper wall of the combustion chamber 3, an intake-valve-side, tilted, lower wall 8a extending aslant from a top portion of the combustion chamber 3 toward an end portion thereof is formed on a side of arrangement of the intake valve 4. On a side of arrangement of the exhaust valve 5, an exhaust-valve-side, tilted, lower wall 8b is formed.

By these tilted lower walls 8a,8b, the combustion chamber 3 is configured on the side of its upper wall in the form of such a pentroof as shown in FIG. 1

Further, the cylinder head 8 is provided with a fuel injection valve (hereinafter simply called the "injector") 1. This injector 1 is arranged to face the combustion chamber 3 at a side of its free end, so that: fuel is directly injected by the injector 1 into the combustion chamber 3.

A description will next be made of the shape of the piston 2. As is illustrated in FIG. 1, FIG. 2(a) through FIG. 2(c) and FIG. 15 through FIG. 22, on the top wall of the piston 2, said top wall forming a lower wall of the combustion chamber 3, an intake-valve-side, tilted, top wall 2a and an exhaust-valve-side, tilted, top wall 2b, which extend aslant toward a center of the piston 2, are formed corresponding to the intake-valve-side, tilted, lower wall 8a and the exhaust-valve-side, tilted, lower wall 8b, respectively. By these tilted top walls 2a,2b, the top wall of the piston 2 is configured in the form of a mountain so that the top wall extends substantially along the pentroof shape. Incidentally, these tilted top walls 2a,2b are divided from each other by a ridge formed on the top wall of the piston.

In the intake-valve-side, tilted, top wall 2a of the piston 2, a recessed portion (hereinafter simply called the "cavity") 25 is formed as shown in FIG. 1 and FIG. 2(a) to FIG. 2(c). This cavity 25 is formed extending to the exhaust-valve-side, tilted, top wall 2b so that the ridge is cut off by the cavity, and is formed in a spherical shape which is curved in a downwardly convex form, and is also formed as a part of an imaginary spherical surface 25a having a center at a point above the piston 2 on a side of the intake valve 4.

An intake port 9 which is a portion of an intake passage and is open to the combustion chamber 3 (see FIG. 12) is arranged extending substantially upright above the intake valve 4. When a flow of inducted air is introduced into the combustion chamber 3 through the intake port 9, the flow of inducted air flows downwardly toward the piston 2 and then upwardly while being guided along the cavity 25 of the piston 2, whereby a tumble flow (longitudinal swirl) is formed.

The tumble flow can be rendered to flow smoother and hence enhanced especially by forming the tilted lower walls 8a,8b of the combustion chamber 3 substantially planar, specifically, by arranging the lower walls 8a,8b of the cylinder head 8 and lower surfaces of the intake valve 4 and the exhaust valve 5 to extend in a substantially coplanar fashion.

Namely, the intake-valve-side lower wall 8a and the exhaust-valve-side lower wall 8b of the cylinder head 8 are formed in the pentroof shape. In this manner, a portion of a tumble flow, said portion flowing from the piston 2 toward the exhaust-valve-side lower wall 8b, and another portion of the tumble flow, said another portion flowing from the intake-valve-side, tilted wall 8a toward the piston 2, are rendered smoother so that the tumble flow is allowed to remain until the latter half of the compression stroke.

Further, the intake port 9 is formed substantially upright so that resistance upon induction of air can be reduced to introduce a strong flow of inducted air into the combustion chamber 3. In this manner, a strong longitudinal swirl (tumble flow) is formed in the combustion chamber 3. In addition, the intake-valve-side, tilted, lower wall 8a of the cylinder head 8 is formed in the pentroof shape which makes it possible to arrange the intake valve 4 in a tilted fashion. This has provided the layout of the intake port 9 with increased freedom.

Incidentally, the primary reasons for which the lower wall of the combustion chamber 8 is formed as described above are set forth below.

In an engine of such an in-cylinder injection type, both high power output and high gas mileage can be achieved by varying the timing of fuel injection depending on the engine speed and/or engine load.

During low-speed rotation or low-load operation of the engine, in particular, lean-burn operation can be performed, that is, a high gas mileage can be achieved by injecting fuel in a compression stroke. Namely, an injection of fuel in a compression stroke makes it possible to form a layer of a high fuel concentration around the spark plug 6 within the cavity 25. Further, the spherical cavity 25 makes it possible to form a tumble flow of inducted air around the above layer. As a consequence, it is possible to assure ignition and to obtain a stable combustion state even if the resulting air-fuel mixture is extremely lean when considered based on the whole combustion chamber.

However, to actually achieve lean-burn operation in a stable combustion state by an injection of fuel in a compression stroke as mentioned above, it is necessary to specify in detail the shape of the combustion chamber 3 and the positions and dimensions of arrangement of the injector 1, the spark plug 6 and the like.

Figure 5A:
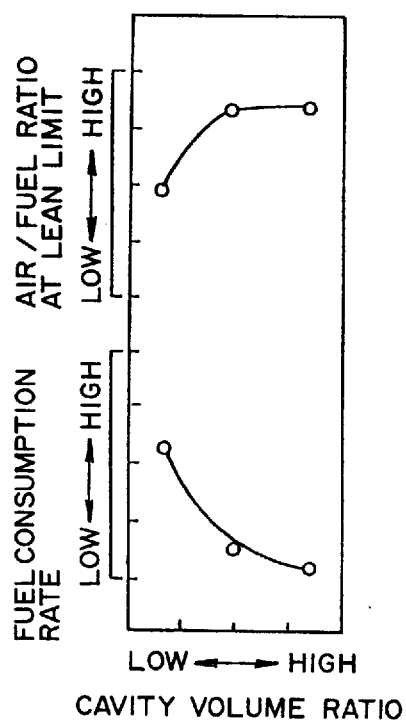
FIGS. 5(a) and 5(b) are graphs for explaining variations in characteristics of the in-cylinder injection internal combustion engine according to the first embodiment of the present invention as a function of variations in the volume ratio of the recessed portion in the piston.

Of these, the volume setting of the cavity 25 substantially affects the engine performance. For example, an excessively large volume of the cavity 25 relative to the total volume of the combustion chamber 3 will result in the provision of the combustion chamber 3 with a large surface area and hence in a large heat loss as shown in the graph of FIG. 5(a), although such an excessively large cavity volume will be advantageous for performing stratified combustion. This is considered to lead to reductions in maximum power output and maximum torque as depicted in the graph of FIG. 5(b), although the gas mileage will be improved.

Figure 5B:
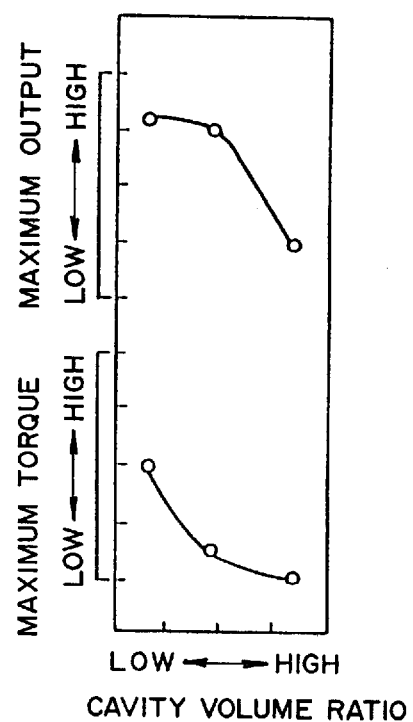
Figure 6A:
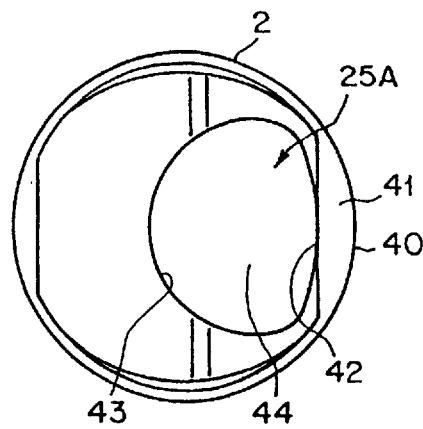
FIGS. 6(a) to FIG. 6(c) are schematic views all showing another example of the shape of the recessed portion in the piston in the in-cylinder injection internal combustion engine according to the first embodiment of the present invention.
Figure 6B:
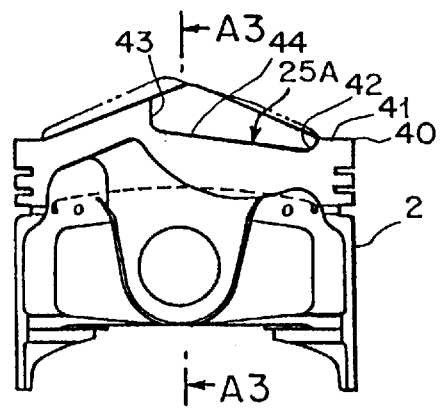
Figure 6C:
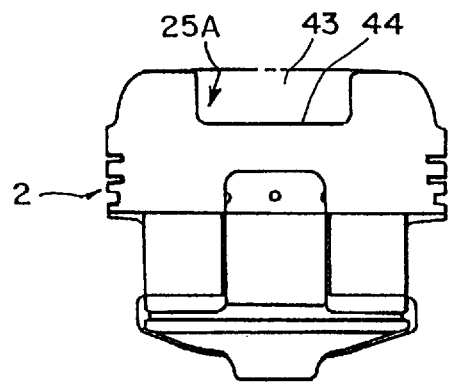
Figure 7A:
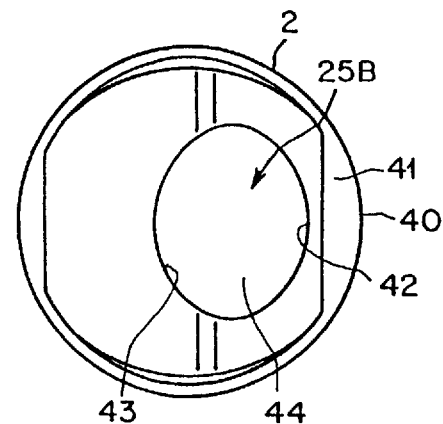
FIG. 7(a) to FIG. 7(c) are schematic views all showing a further example of the shape of the recessed portion in the in-cylinder injection internal combustion engine according to the first embodiment of present invention.
Figure 7B:
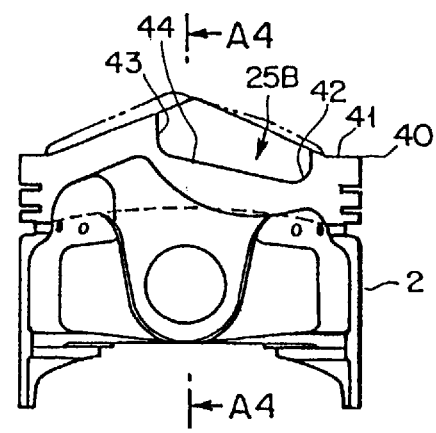
Figure 7C:
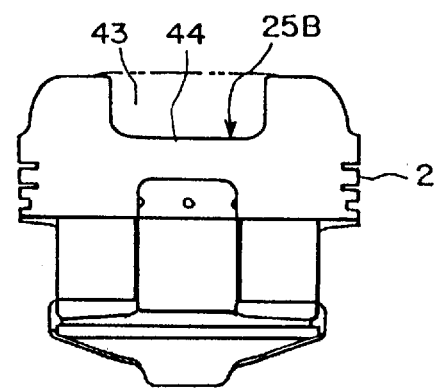

On the other hand, an excessively small volume of the cavity 25 relative to the total volume of the combustion chamber 3 will lead to a failure in maintaining a sufficient tumble flow in the cavity 25 until a later stage of a compression stroke although the maximum power output and the maximum torque will be improved as illustrated in the graph of FIG. 5(b). This will result in a reduction in gas mileage as shown in the graph of FIG. 5(a).

In the in-cylinder injection internal combustion engine according to the present invention, the volume of the cavity 25 is therefore set to give a predetermined ratio to the total volume of the combustion chamber so that both the power output performance and the gas mileage performance of the engine can be attained.

Figure 4:
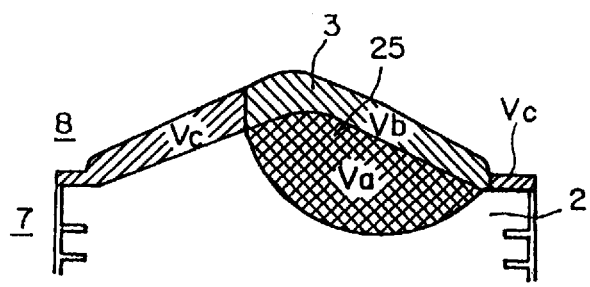
FIG. 4 is a schematic illustration for explaining the ratio of the volume of a recessed portion of the piston to the overall volume of a combustion chamber in the in-cylinder injection internal combustion engine according to the first embodiment of the present invention.

A description will now be made of the setting of the above volume ratio with reference to FIG. 4. The volume ratio is set to make the value of (Va+Vb)/(Va+Vb+Vc) fall within a range of from 0.4 to 0.6 where Va represents the volume of the cavity 25, Vb means a volume between the intake-valve-side, tilted, lower wall 8a and the intake-valve-side, tilted, top wall 2a and between the exhaust-valve-side, tilted, lower wall 8b and the exhaust-valve-side, tilted, top wall 2b, and over the cavity 25 when the piston 2 is at the top dead center, and Vc denotes a volume between the intake-valve-side, tilted, lower wall 8a and the intake-valve-side, tilted, top wall 2a and between the exhaust-valve-side, tilted, lower wall 8b and the exhaust-valve-side, tilted, top wall 2b, and in a range other than an area over the cavity 25 when the piston 2 is at the top dead center.

In this embodiment, to form the combustion chamber 3 of the construction as described above, the top wall of the piston 2 is configured in the form of such a mountain as extending substantially along the pentroof shape of the cylinder head 8. Namely, the formation of top wall of the piston 2 into such a pentroof shape can make smaller the space defined by the piston 2 and the cylinder head 8 when the piston 2 is in its ascended position. It is therefore possible to increase the volume ratio of the cavity 25 to the whole volume of the combustion chamber 3.

As a consequence, the compression ratio of the engine can be increased so that its power output can be improved to a substantial extent.

By setting the volume ratio of the cavity 25 at such a predetermined value as described above, an improvement in gas mileage and an improvement in power output can be both achieved in a well-balanced fashion.

Figure 2A:
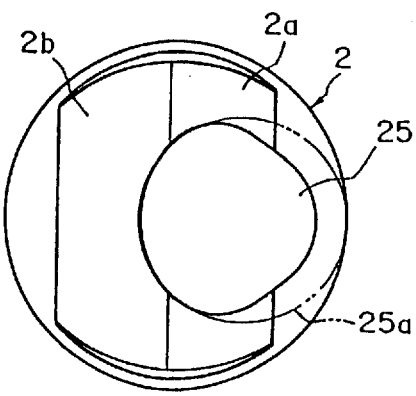
FIG. 2(a) to FIG. 2(c) are schematic views all showing the shape of a piston as an essential element in the in-cylinder injection internal combustion engine according to the first embodiment of the present invention.
Figure 2B:
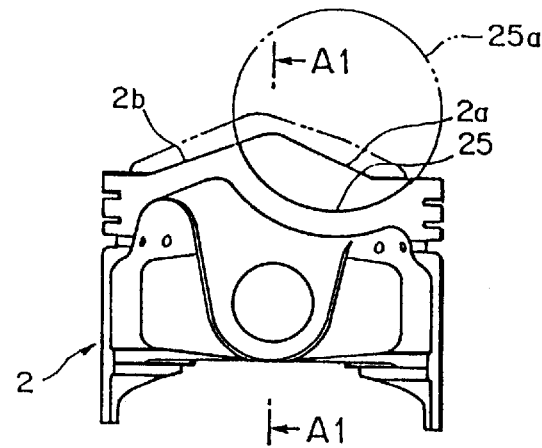
Figure 2C:
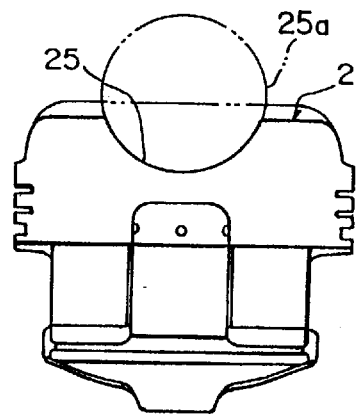

Further, the formation of the cavity 25 in such a spherical shape as depicted in FIG. 2(a) to FIG. 2(c) has the merit that the cavity surface area can be minimized relative to the cavity volume Va of the piston 2. Minimization of the cavity surface area in the manner as mentioned above makes it possible to reduce the heat loss and hence to improve the efficiency of combustion.

Further, the formation of the cavity 25 in the spherical shape has another merit that formation of a swirl flow, in other words, a tumble flow by a flow of inducted air within the combustion chamber 3 can be facilitated.

In addition, the above-described imaginary spherical surface 25a is set so that as is illustrated in FIG. 1, a top portion of the piston 2 and a lower edge of the intake-valve-side, tilted, top wall 2a of the piston 2 are both included within the cavity 25 as seen in a cross-section taken along a central axis of the piston 2.

The positional relationship among the injector 1, the intake valve 4 and the imaginary spherical surface 25a is set so that, when the piston 2 has reached the top dead center, the injection nozzle of the injector 1 and the valve element of the intake valve 4 are both located within the imaginary spherical surface 25a.

Arrangement of the injector 1 and the intake valve 4 in the manner as described above makes it possible to ensure the establishment of a high fuel-concentration state in the cavity 25 at the time of ignition.

In such an in-cylinder injection internal combustion engine, the timing and quantity of fuel injection by the injector 1 are controlled in accordance with an operation state of the engine by a controller 1c (FIG. 1). Depending on the operation state of the engine, fuel injection may be performed in compression stroke.

In this case, a gas-fuel mixture is formed as layers of air and fuel in the combustion chamber 3 and the fuel (indicated by a meshed area in FIG. 1) is present rather abundantly in the cavity 25. Different from a conventional internal combustion engine in which a substantially homogeneous air-fuel mixture is present in a combustion chamber, electrodes of a spark plug therefore do not reach a position where a combustible air-fuel mixture of a sufficient concentration exists, presumably leading to a reduction in the efficiency of combustion, provided that a conventional spark plug for internal combustion engine is employed.

According to the in-cylinder injection internal combustion engine of the present invention, the position of arrangement of the spark plug 6 and the length of the electrode 6a are therefore set to be most suited for the combustion of fuel so that combustion of the fuel can be ensured.

Described specifically, the spark plug 6 is arranged with a central axis of the spark plug 6 inclined toward a side of the exhaust valve 5 over a predetermined angle $\theta$ relative to a central axis CL of the cylinder so that during an ascent of the piston 2 to the top dead center, the electrode 6a of the spark plug 6 is ensured to assume a position on a side of the cavity 25 while avoiding interference between the piston 2 and the spark plug 6.

In the cylinder head 8, a spark plug mounting portion 28 is formed to mount the spark plug 6. The spark plug mounting portion 28 is provided with a spark plug mounting surface 27 formed to define a mounting place for the spark plug 6. This mounting surface 27 is also arranged closer by a predetermined length D1 (for example, D1=2 mm) toward the combustion chamber 3 than that in a conventional internal combustion engine.

The spark plug 6 is therefore mounted on the cylinder head 8 as described above, so that it can be located closer toward the cavity 25.

In this case, however, a lower threaded portion of the spark plug 6 is exposed over the predetermined length D1 to the interior of the combustion chamber 3. If the engine is operated in this state, carbon and the like will deposit on the lower portion of the spark plug 6. Deposition of carbon or the like on the lower threaded portion of the spark plug 6 in turn makes it difficult to unscrew the spark plug 6 from the cylinder head 8, so that the efficiency of work is considered to deteriorate.

In the in-cylinder injection internal combustion engine, a bulged portion 29 is therefore formed around an area below the spark plug mounting portion 28 as shown in FIG. 1 so that the lower portion of the spark plug 6 can be protected.

This makes it possible to prevent deposition of carbon and the like on the lower portion of the spark plug 6, thereby improving the efficiency of work upon replacement of the spark plug and also the durability of the spark plug 6. In addition, the provision of the bulged portion 29 as described above also permits through the bulged portion 29 dissipation of heat applied to the spark plug 6 so that the durability of the spark plug 6 against heat can be improved.

Further, the electrode 6a of the spark plug 6 is formed longer by a predetermined value than a conventional spark plug. As a consequence, the electrode 6a is allowed to assume a position in a fuel-rich area upon ignition of the fuel.

Incidentally, it may also be contemplated of constructing the engine in such a way that the mounting surface 27 of the spark plug 6 is formed at a position similar to that in conventional internal combustion engines but the electrode 6a alone of the spark plug 6 is formed longer by the predetermined length D1 to position the electrode 6a within the cavity 25 at a place where the concentration of fuel is high. This is to achieve fail-free ignition of the fuel by making only the electrode 6a extremely longer. In this design, the above-mentioned bulged portion 29 is no longer needed but, if only the electrode 6a is made extremely longer as mentioned above, the durability of the electrode 6a is considered to drop.

In contrast, the point of ignition in the present invention is set closer to the interior of the cavity 25 by a two-step designing consideration, that is, by making the mounting surface 27 of the spark plug 6 closer toward the combustion chamber 3 and forming the electrode 6a longer. This has brought about the merit that the durability of the spark plug 6 is not impaired although the electrode 6a is ensured to assume a position within the cavity 25 at the place where the concentration of fuel is high. As a result, the fuel can be surely ignited so that the efficiency of combustion can be improved.

With respect to the value of the clearance (which is designated by D2 in FIG. 1) between the ground electrode 6a of the spark plug 6 and the surface of the cavity 25, it is also necessary to set the clearance D2 at an optimal value because it affects the output and gas mileage of the engine. Described specifically, if this clearance D2 is too large, the electrode 6a of the spark plug 6 does not sufficiently reach the fuel which is carried in a tumble flow of inducted air formed inside the combustion chamber 3, and the efficiency of combustion is hence deteriorated. On the other hand, if the clearance between the ground electrode 6a and the surface of the cavity 25 is too small, interference may take place between the electrode 6a and the piston 2.

In the in-cylinder injection internal combustion engine according to the present invention, the distance D2 between the ground electrode 6a and the surface of the cavity 25 at the top dead center of the piston 2 is set at an optimal value (for example, D2=approximately 1 to 2 mm) so that a high combustion efficiency can be obtained while fully avoiding interference with the piston 2.

Further, in such an in-cylinder injection internal combustion engine, the clearance between the piston 2 and the exhaust valve 4 at the closest parts thereof, said clearance being called the "exhaust-side clearance" and being indicated by D3 in FIG. 1, also considerably affects the performance of the engine. For example, if the exhaust-side clearance D3 is too large as shown by points C and D in the graph of FIG. 8, the fuel atomized through the injector in a compression stroke spreads out of the cavity 25, resulting in a deterioration in gas mileage.

On the other hand, if the exhaust-side clearance D3 is too small as indicated by points A and B, a flame is not allowed to fully propagate to the space on the side of the exhaust valve 5 during full-power operation (namely, upon injection of the fuel in an intake stroke), resulting in a reduction in power output.

Figure 8:
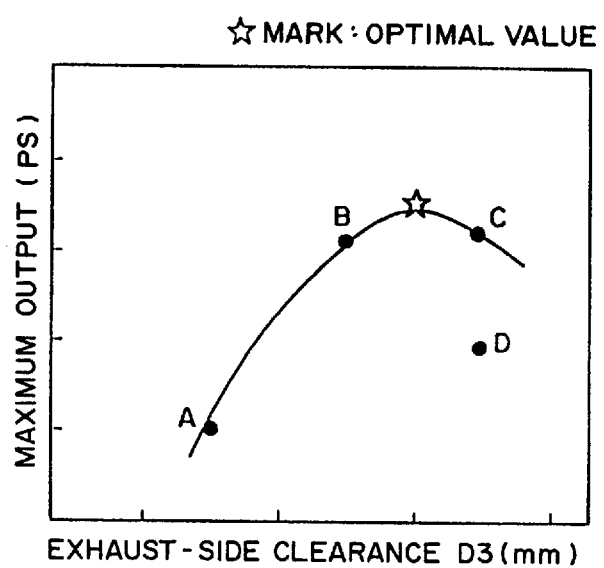
FIG. 8 is a graph for explaining action in the in-cylinder injection internal combustion engine according to the first embodiment of the present invention.

In the in-cylinder injection internal combustion engine according to the present invention, the exhaust-side clearance D3 is set at such an optimal value as achieving good balance between gas mileage and power output and hence efficient combustion (in the vicinity of the star mark shown in FIG. 8, i.e., D3=5 to 8 mm).

By forming the cavity 25 in a spherical shape and arranging the cavity 25 and the spark plug 6 to optimize their positional relationship as described above, it is also possible to promote the stratification of inducted air and fuel at the time of low-speed rotation or low-load operation of the engine even if the air-fuel mixture is extremely lean when considered based on the whole combustion chamber 3. Accordingly, ignition and combustion can be performed surely.

As a result, a stable combustion state can be obtained and lean-burn operation can be realized even if the air-fuel mixture is extremely lean when considered based on the whole combustion chamber 3.

Further, as is illustrated in FIG. 1 and FIG. 2, a flame-propagating space 26 is formed between the exhaust-valve-side, tilted, top wall 2b of the piston 2 and the exhaust-valve-side, tilted lower wall 8b of the cylinder head 8 so that an ignited flame is allowed to evenly spread throughout the combustion chamber 3.

Figure 3:
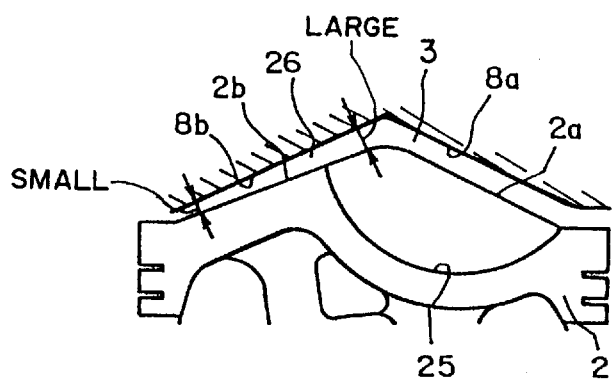
FIG. 3 is a schematic illustration of a relative positional relationship between a top wall of the piston and a lower wall of a cylinder head in the in-cylinder injection internal combustion engine according to the first embodiment of the present invention.

Here, the intake-valve-side, inclined, lower wall 8a and exhaust-valve-side, inclined, lower wall 8b of the cylinder head 8 are formed at substantially the same inclination, and the exhaust-valve-side, tilted, top wall 2b of the piston 2 is set at an inclination smaller than the exhaust-valve-side, tilted, lower wall 8b of the cylinder head 8. As a consequence, the above-mentioned flame-propagating space 26 is formed in such a shape that, as is depicted in FIG. 3, the distance between the opposing walls 2b and 8b increases toward the center of the combustion chamber, namely, is formed as a space substantially wedge-shaped in cross-section.

The followings are reasons for which the wedge-shaped flame-propagating space 26 is formed on the side of the exhaust valve 4 in the combustion chamber 3 as described above. In the combustion chamber 3 of the in-cylinder injection internal combustion engine in which combustion chamber the cavity 25 is formed as described above, the exhaust-valve-side, tilted, top wall 2b and the exhaust-valve-side, tilted, lower wall 8b are usually formed substantially in parallel with each other and the space defined between these walls 2b and 8b is formed narrow. Propagation of a flame into this space subsequent to ignition of fuel tends to be delayed. To make uniform the propagation of a flame in the combustion chamber 3, it may hence be contemplated of simply widening the space between the exhaust-valve-side, tilted, top wall 2b and the exhaust-valve-side, tilted, lower wall 8b. However, as has been described above, an optimal volume ratio exists between the total volume (i.e., the space portions Va+Vb+Vc in FIG. 4) of the combustion chamber 3 and the volume of the upper space (Va+Vb).

If the space on the side of the exhaust valve 5 in the combustion chamber 3 is simply widened, it may then become difficult to set the volume ratio of the cavity 25 at an optimal value. It is therefore postulated that the performance of the engine could be deteriorated conversely.

In the space of the combustion chamber 3 on the side of the exhaust valve 5, the wedge-shaped flame-propagating space 26 has therefore been formed by making the clearance greater on the side of the center and correspondingly making the clearance smaller in an end portion on the side of the exhaust valve 5 as described above.

Owing to the provision of the flame-propagating space 26, a flame which has first initiated combustion centering around the electrode 6a of the spark plug 6 is ensured to spread out toward the relatively wide center of the combustion chamber 3 and also toward the relatively narrow end portion of the combustion chamber 3 without a delay relative to the propagation of the flame to other portions of the combustion chamber 3. It is therefore possible to perform uniform combustion without irregularity.

The formation of the space of the combustion chamber 3 in the substantially wedge-shaped form in cross-section on the side of the exhaust valve 5 as described above does not change the volume of the space of the combustion chamber 3 on the side of the exhaust valve 5, thereby bringing about the merit that the setting of the cavity ratio is not affected at all.

Owing to the construction as described above, the in-cylinder injection internal combustion engine and the piston for the in-cylinder injection internal combustion engine, according to the first embodiment of the present invention, can bring about the following advantageous effects.

Namely, the formation of the cavity 25 in the spherical shape and the arrangement of the cavity 25 and the spark plug 6 in the optimized relative positional relationship makes it possible to also promote the stratification of inducted air and fuel at the time of low-speed rotation or low-load operation of the engine even if the resulting air-fuel mixture is extremely lean when considered based on the whole combustion chamber 3, thereby permitting sure ignition and combustion.

Described specifically, at the time of low-speed rotation or low-load operation of the engine, fuel is injected in a compression stroke. In this case, a tumble flow is maintained until a later stage of the compression stroke in the cavity 25. It is therefore possible to concentrate the fuel in the vicinity of the spark plug 6 by making the fuel, which is injected toward the cavity 25, remain locally without allowing same to spread throughout the cavity 25. Further, layers of inducted air (air layers) can also be formed around a layer of the fuel formed in the tumble flow, thereby making it possible to promote the stratification of the inducted air and the fuel.

Even if an air-fuel mixture is extremely lean when considered based on the whole combustion chamber 3, a stable combustion state can therefore be obtained so that lean-burn operation can be achieved.

In addition, the formation of the downwardly convex, curved, spherical cavity 25 in the intake-valve-side, tilted, top wall 2a of the piston 2 as shown in FIG. 2(a) to 2(c) has the merit that the power output and the gas mileage can be improved.

Namely, the formation of the cavity 25 in the spherical shape has made it possible to minimize the surface area of the cavity relative to the cavity volume Va of the piston 2. This can reduce the heat loss and hence the combustion efficiency.

In addition, the formation of the cavity 25 in the spherical shape promotes the formation of a swirl, in other words, a tumble flow by inducted air in the combustion chamber 3, thereby bringing about the merit that stratified combustion can be performed easily. Further, the formation of the tumble flow can be enhanced by forming the tilted lower walls 8a,8b of the combustion chamber 3 substantially planar.

Figure 9:
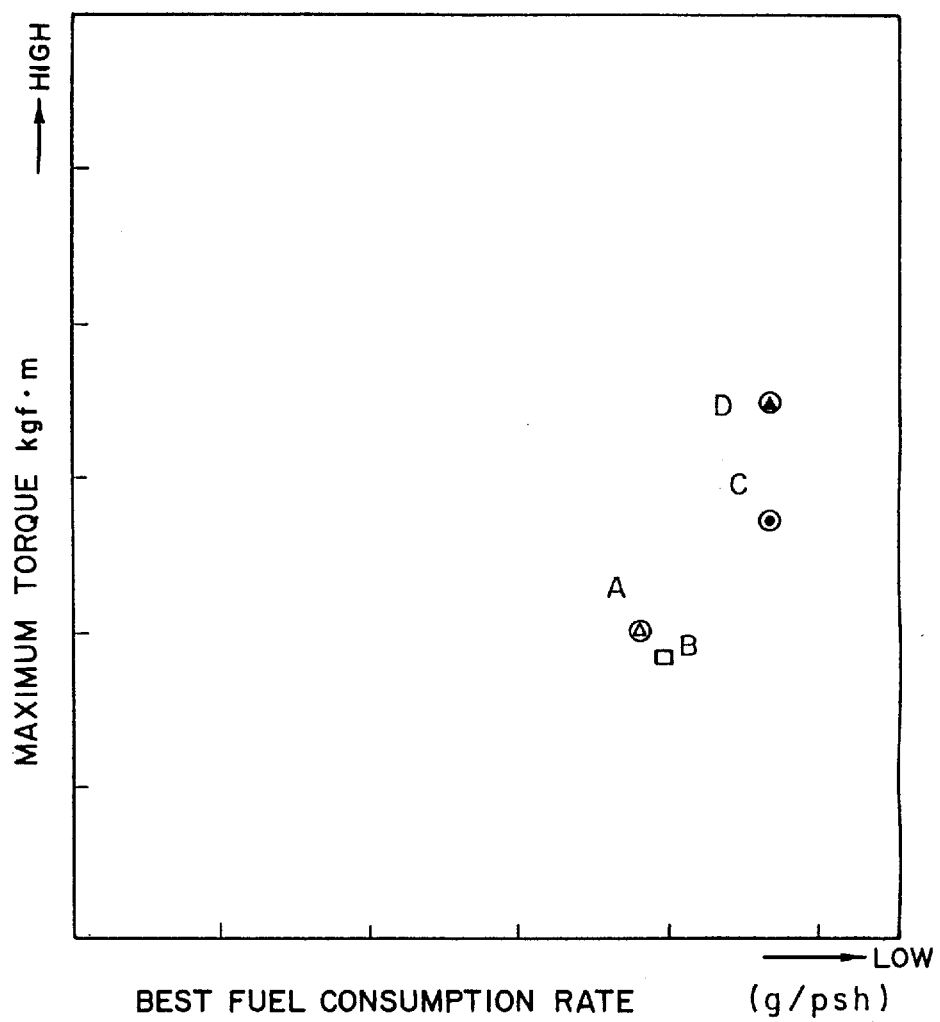
FIG. 9 is a graph for explaining action in the in-cylinder injection internal combustion engine according to the first embodiment of the present invention.

FIG. 9 diagrammatically compares the piston 2 having the spherical cavity 25 with the pistons 2 having the cavities 25A,25B of different shapes. Compared the gas mileage and maximum torque corresponding to the cavities 25A,25B of the different shapes in cross-section, said gas mileage and maximum torque being indicated by points A and B, respectively, in the drawing, the piston 2 equipped with the spherical cavity 25 can improve both the gas mileage and the maximum torque as indicated by a point C.

In addition to the piston 2 having the spherical cavity 25, the provision of the flame-propagating space 26 of the substantially wedge-like shape in cross-section on the side of the exhaust valve 5 of the combustion chamber 3 has the merit that the maximum torque can be improved further as indicated by a point D.

Figure 10:
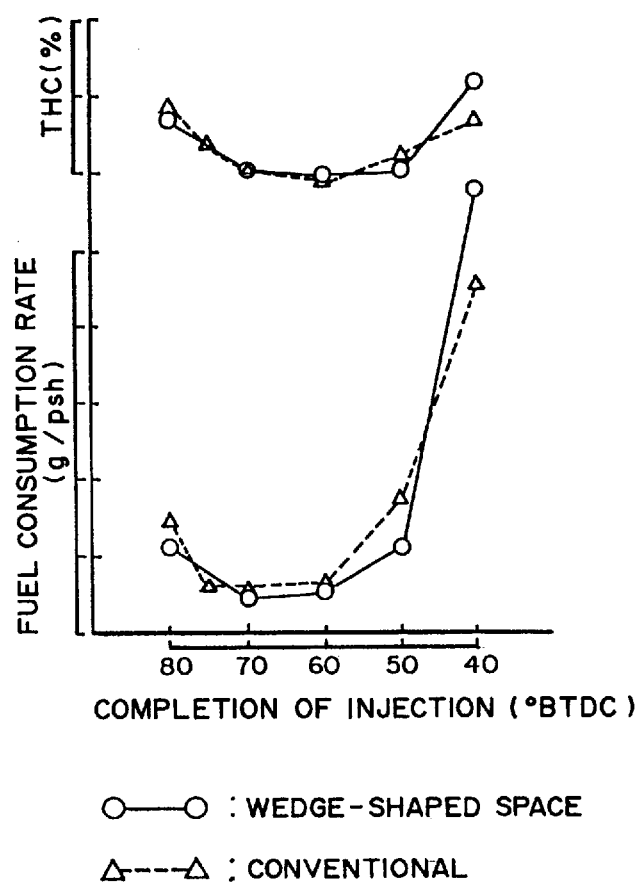
FIG. 10 is a graph showing variation characteristics of gas mileage and HC emission as a function of differences in the shape of the combustion chamber in the in-cylinder injection internal combustion engine according to the first embodiment of the present invention.

Further, as is illustrated in FIG. 10, the provision of the wedge-shaped flame-propagating space 26 as described above has the merits that the fuel consumption can be reduced over substantially the entire range and the emission of THC (total hydrocarbons) can also be reduced.

In the in-cylinder injection internal combustion engine according to the present invention, the point of ignition on the electrode 6a is positioned in a portion of the cavity 25, at which portion the concentration of fuel is high, by the two-step construction that the mounting surface 27 of the spark plug 6 is arranged closer by the predetermined length D1 (for example, D1=2 mm) toward the combustion chamber 3 and the ground electrode 6a of the spark plug 6 is made longer by the predetermined length than that of the conventional spark plugs. This has brought about the merit that the durability of the ground electrode 6a of the spark plug 6 is not impaired although ignition of the fuel is ensured.

Moreover, the above-described spark plug 6 also has the merit that sure ignition of fuel can be achieved at low cost because it is only necessary to form the electrode 6a longer by the predetermined length compared with the conventional spark plugs.

Further, on the wall of the cylinder head 8, the bulged portion 29 is formed around the mounting portion 28 for the spark plug 6. The spark plug 6 is therefore not directly exposed at a lower end portion thereof to the combustion chamber 3 despite the extension of the lower end of the spark plug 6 by the predetermined length D1 toward the combustion chamber 3.

This has made it possible to prevent deposition of carbon and the like on a threaded portion of a lower part of the spark plug 6, leading to an improvement in the efficiency of working such as replacement of the spark plug 6. There is also the merit that the durability of the spark plug 6 itself can be improved, because the lower part of the spark plug 6 is protected by the bulged portion 29. Further, heat which is applied to the spark plug 6 can be dissipated to the cylinder head 8 via the bulged portion 29, thereby bringing about the merit that the durability to heat can also be improved.

On the other hand, the formation of the cavity 25 of the piston 2 so that the piston 2 is embraced within the imaginary spherical surface 25a at the top of the piston 2 and also at the lower end of the intake-valve-side, tilted, upper wall 2a of the piston 2 has made it possible to easily arrange the spark plug 6 in the cavity 25. This formation also has the merit that formation of a tumble flow can be promoted.

Since the positional relationship among the injector 1, the intake valve 4 and the imaginary spherical surface 25a is set to position the injection nozzle of the injector 1 and the valve element of the intake valve 4 within the imaginary spherical surface 25a when the piston 2 has reached the top dead center, a rich air-fuel mixture can be formed in the cavity 25.

Further, the value of (Va+Vb)/(Va+Vb+Vc) is set to fall within the range of from 0.4 to 0.6 where Va represents the volume of the cavity 25, Vb means the volume over the cavity 25 when the piston 2 is at the top dead center, and Vc denotes the volume in the range other than the area over the cavity 25 when the piston 2 is at the top dead center. There is hence the merit that an improvement in gas mileage and an improvement in power output can be both achieved in a well-balanced fashion.

Namely, as is illustrated in FIG. 5(a) and FIG. 5(b), an unduly large cavity volume ratio leads to reductions in maximum torque and maximum power output while an excessively small cavity volume ratio leads to a reduction in gas mileage. However, the setting of the cavity volume ratio at the optimal value has made it possible to achieve both an improvement in gas mileage and an improvement in power output.

The exhaust-side clearance D3 is set at the optimal value (D3=5 to 8 mm) as indicated by the star mark in the graph of FIG. 8. This has led to the merit that a combustion state of a high thermal efficiency can be realized, thereby also leading to an improvement in maximum power output.

Further, the setting of the clearance D2 between the ground electrode 6a of the spark plug 6 and the surface of the cavity 25 at an optimal value (for example, D2=approximately 1 to 2 mm) has brought about the merit that a high combustion efficiency can be obtained while fully avoiding interference of the spark plug 6 with the piston 2.

The formation of the lower wall of the cylinder head 8 in the pentroof shape has the merit that a strong longitudinal swirl can be maintained even in a compression stroke and injection of fuel in the compression stroke can be performed stably.

As the intake-valve-side, tilted, top wall 2a and the exhaust-valve-side, tilted, top wall 2b are arranged in the form divided from each other by the ridge on the top wall of the piston, the combustion chamber 3 can be formed in different shapes on the sides of the intake-valve-side, tilted, lower wall 8a and the exhaust-valve-side, tilted, lower wall 8b, respectively, so that roles of the combustion chamber 3 can be assigned separately to the side of the intake valve 4 and to the side of the exhaust valve 5.

In the first embodiment, the wedge-shaped, flame-propagating space 26 was formed by forming the intake-valve-side, titled, lower wall 8a and the exhaust-valve-side, titled, lower wall 8b of the cylinder head 8 at substantially the same inclination and the exhaust-valve-side, tilted, top wall 2b of the piston 2 at the inclination smaller than the exhaust-valve-side, tilted, lower wall 8b. In contrast, it is also possible to form the wedge-shaped, flame-propagating space 26 by forming the intake-valve-side, tilted, top wall 2a and the exhaust-valve-side, tilted, top wall 2b of the piston 2 at the same inclination and the exhaust-valve-side, tilted, lower wall 8b of the cylinder head 8 at an inclination greater than the exhaust-valve-side, titled, top wall 2b of the piston 2.

A description will next be made of a first to third modifications of the in-cylinder injection internal combustion engine according to the first embodiment. FIG. 6, FIG. 7 and FIG. 23 through FIG. 30 illustrate the first modification, which is different only in the shape of the recess 25 from the above-described first embodiment. Namely, in the first modification, the recess 25 is formed as cavities 25A,25B having a substantially rectangular shape in cross-section as shown in FIG. 6(a) through FIG. 6(c) and FIG. 7(a) through FIG. 7(c).

A brief description will now be made of the piston 2 provided with a cavity 25A(25B). Formed on an outer peripheral edge portion 40 of the top wall of the piston, said edge portion being located on the side of the intake valve 4, is a planar portion 41 which extends at a right angle relative to the direction of movements of the piston 2. Further, the cavity 25A(25B) are formed of a guide portion 42 for guiding a flow of inducted air to the cavity 25A(25B), a raised portion 43 for guiding the flow of inducted air, which has flowed into the cavity 25A(25B), toward a vicinity of the spark plug 6, and a connecting portion 44 connecting said guide portion and said raised portion with each other and formed as a substantially planar surface.

As a result, the flow of inducted air is allowed to flow in along the guide portion 42 formed smoothly between the planar portion 41 and the bottom wall (the connecting portion 44) of the cavity 25A(25B). Thereafter, the flow of inducted air is deflected upwards at the raised portion 43 and is then allowed to advance toward the vicinity of the spark plug 6. A tumble flow is therefore formed.

Despite the arrangement of the cavity 25A(25B), the in-cylinder injection internal combustion engine can therefore has the merit that it is superior in both gas mileage and power output to conventional in-cylinder injection internal combustion engines.

Further, FIG. 31 through FIG. 38 illustrate the second modification of the in-cylinder injection internal combustion engine according to the first embodiment, which is different from the above-described first embodiment only in that a recess 52 is formed in the piston 2 at a position adjacent to the cavity 25 to ensure provision of a space in the vicinity of the spark plug.

FIG. 39 through FIG. 46, on the other hand, illustrate the third modification of the in-cylinder injection internal combustion engine according to the first embodiment, in which in addition to the cavity 25, a recess (valve recess) 50 is formed to ensure provision of a clearance between the piston 2 and the exhaust valve 5.

Even an in-cylinder injection internal combustion engine provided with a piston constructed like the second or third modification has the merit that like the above-described first modification, it is superior in gas mileage and power output to the conventional in-cylinder injection internal combustion engines.

(b) Description of the second embodiment

Next, a description will be made of the in-cylinder injection internal combustion engine according to the second embodiment of the present invention. FIG. 11(a) through FIG. 11(c) and FIGS. 47 through 54 schematically illustrate the piston as an essential element thereof. It is to be noted that this second embodiment is different only in the shape of a recess of a piston 2 from the above-described first embodiment and is common in the remaining construction to the first embodiment.

In an engine of such an in-cylinder injection type, both high power output and high gas mileage can be achieved by varying the timing of fuel injection depending on the engine speed and/or engine load. During low-speed rotation or low-load operation of the engine, in particular, lean-burn operation can be performed, that is, a high gas mileage can be achieved by injecting fuel in a compression stroke. Namely, an injection of fuel in a compression stroke makes it possible to retain a tumble flow in the cavity 25 until a later stage of the compression stroke, so that a layer of a high fuel concentration can be formed in a tumble flow around the spark plug 6 within the cavity 25 and layers of inducted air can also be formed around the fuel layer. It is therefore possible to assure ignition and to obtain a stable combustion state even if the resulting air-fuel mixture is extremely lean when considered based on the whole combustion chamber.

However, to actually achieve lean-burn operation in a stable combustion state by an injection of fuel in a compression stroke as mentioned above, it is necessary to specify in detail the shape of the combustion chamber 3 and the positions and dimensions of arrangement of the injector 1, the spark plug 6 and the like.

In this second embodiment, the combustion chamber 3 is hence formed as will be described below.

Figure 11A:
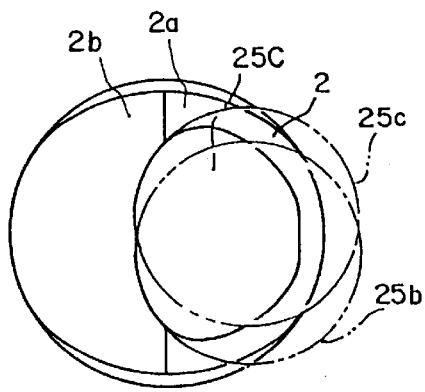
FIGS. 11(a) to FIG. 11(c) are schematic views all showing the shape of a piston as an essential element in an in-cylinder injection internal combustion engine according to a second embodiment of the present invention.
Figure 11B:
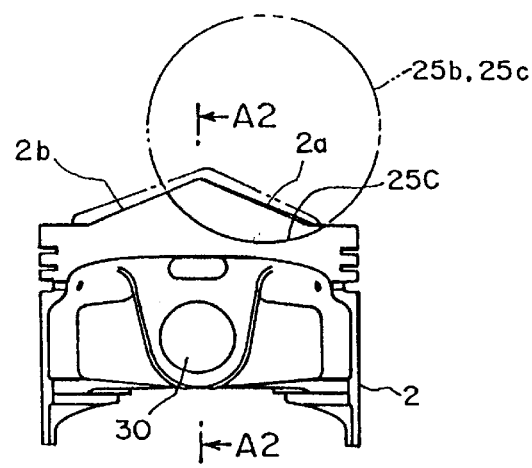
Figure 11C:
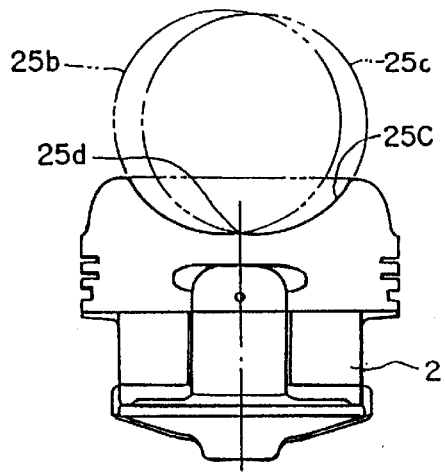

As is illustrated in FIG. 11(a) through FIG. 11(c), a downwardly convex, curved cavity 25C is formed in a top wall of the piston 2 on a side of the intake valve 4.

This cavity 25C is, as is shown in FIG. 11(c), formed by two imaginary spherical surfaces 25b,25c, whose centers are located adjacent to each other in an upper part on the side of the intake valve 4, and a connecting surface 25d which smoothly connects the two spherical surfaces 25b and 25c with each other.

The centers of these imaginary spherical surfaces 25b,25c are, as are illustrated in FIG. 11(a), set at positions so that the centers are offset in opposite directions by the same distance relative to an axis which extends at a right angle relative to a direction of arrangement of a piston pin 30.

The connecting surface 25d is formed as a cylindrical surface via which lower parts of the two spherical surfaces 25b,25c are connected together. Therefore, the cross-sectional shape of the combustion chamber 3 is substantially the same as that of the combustion chamber in the above-described first embodiment.

According to the cavity 25C, it is possible to provide the piston 2 with a large cavity volume while making the cavity surface area relatively small compared with the cavity volume.

It therefore becomes possible to improve the gas mileage without inviting a substantial reduction in heat loss, namely, without substantial reductions in output characteristics.

The formation of the cavity 25C in the substantially spherical shape also has the merit that the formation of a swirl, in other words, a tumble flow by a flow of inducted air in the combustion chamber 3 can be promoted.

As the in-cylinder injection internal combustion engine according to the second embodiment of the present invention is constructed as described above, a flow of inducted air which has flowed into the combustion chamber 3 through the intake valve 4 is guided by the cavity 25C formed in the piston 2 to form a tumble flow and further, injection of fuel into this tumble flow makes it possible to form a layer of a high fuel concentration and layers of inducted air in the tumble flow.

It is to be noted here that, because the two imaginary spherical surfaces 25b,25c forming the cavity 25C are located adjacent to each other along the direction of arrangement of the piston pin 30, they are formed as a spherical cavity as viewed in the flowing direction of a flow of inducted air, that is, in the direction in which a tumble flow is formed [see FIG. 11(b)]. Accordingly, stratified combustion can be performed as in the first embodiment.

Namely, the shape of the cavity 25C and the arrangement of the cavity 25C and the spark plug 6 in the optimized relative positional relationship also make it possible to promote the stratification of inducted air and fuel and hence to perform sure ignition and combustion at the time of low-speed rotation or low-load operation of the engine even if the resulting air-fuel mixture is extremely lean when considered based on the whole combustion chamber 3.

Described specifically, at the time of low-speed rotation or low-load operation of the engine, fuel is injected in a compression stroke. In this case, a tumble flow is maintained until a later stage of the compression stroke in the cavity 25C. It is therefore possible to concentrate the fuel in the vicinity of the spark plug 6 by making the fuel, which is injected toward the cavity 25C, remain locally without allowing same to spread throughout the cavity 25C. Further, layers of inducted air can also be formed around a layer of the fuel formed in the tumble flow, thereby making it possible to promote the stratification of the inducted air and the fuel.

Even if an air-fuel mixture is extremely lean when considered based on the whole combustion chamber 3, a stable combustion state can therefore be obtained so that lean-burn operation can be achieved.

Further, the above-mentioned cavity 25C can make the cavity surface area relatively small while providing the piston with a large cavity volume. This has the merit that the gas mileage can be improved without any substantial reductions in power output characteristics.

It is also to be noted that the above-mentioned connecting surface 25d is not necessarily limited to such a cylindrical surface but may be a surface of any other shape insofar as it can smoothly connect the two spherical surfaces 25b and 25c with each other.

(c) Description of the third embodiment

Figure 12:
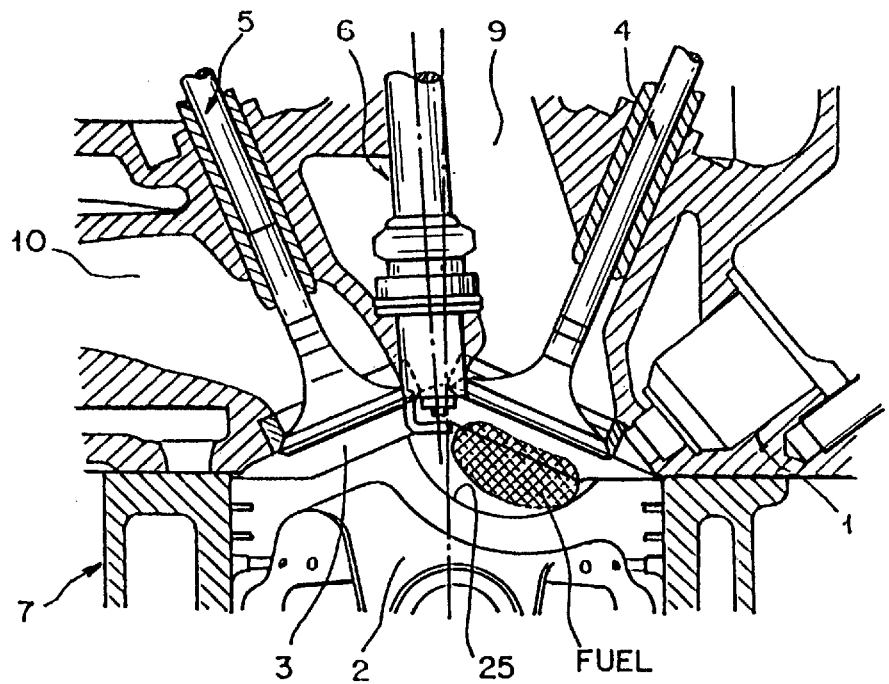
FIG. 12 is a schematic cross-sectional view showing the construction of a combustion chamber in an in-cylinder injection internal combustion engine according to a third embodiment of the present invention.

A description will next be made of an in-cylinder injection internal combustion engine according to the third embodiment of the present invention. FIG. 12 is the schematic illustration showing the construction of its combustion chamber.

As is shown in FIG. 12, this embodiment is constructed basically like the first embodiment.

In an engine of such an in-cylinder injection type, both high power output and high gas mileage can be achieved by varying the timing of fuel injection depending on the engine speed and/or engine load.

During low-speed rotation or low-load operation of the engine, in particular, lean-burn operation can be performed, that is, a high gas mileage can be achieved by injecting fuel in a compression stroke.

Namely, an injection of fuel in a compression stroke makes it possible to form a layer of a high fuel concentration around the spark plug 6 within the cavity and by the cavity, also to form a tumble flow of inducted air around the above-described layer. It is therefore possible to assure ignition and to obtain a stable combustion state even if the resulting air-fuel mixture is extremely lean when considered based on the whole combustion chamber.

However, to actually achieve lean-burn operation in a stable combustion state by an injection of fuel in a compression stroke as mentioned above, it is necessary to specify the shape of the combustion chamber 3 and the like.

In this third embodiment, the combustion chamber 3 is hence formed as will be described below.

Namely, a top wall of a combustion chamber 3 is configured in the form of a pentroof by a lower wall of a cylinder head 8, and a top wall of a piston 2 is also configured in the form of a mountain corresponding to the pentroof shape of the cylinder head 8. Further, the piston 2 is provided with a cavity 25 which is formed in a spherical shape.

The injection nozzle of the injector 1 is arranged directly facing the interior of the combustion chamber 3 so that fuel is injected directly into the combustion chamber 3. Further, the injector 1 is controlled, for example, by an unillustrated controller to inject fuel in a predetermined quantity at a predetermined timing from the injector 1.

The fuel is injected toward the cavity 25 of the piston 2. Air, which has been inducted through the intake port 9 arranged substantially upright above the intake valve 4, and the fuel are mixed in the combustion chamber 3, whereby an air-fuel mixture is formed. The air-fuel mixture is then ignited by the spark plug 6 in the combustion chamber 3 and subsequent to expansion (power production), the resulting combustion gas is discharged through the exhaust port 10. Among the numerals shown in the drawing, numeral 7 indicates a cylinder block and numeral 8 designated the cylinder head.

In the third embodiment, neither the mounting position of the spark plug 6 nor the numeral values of the setting of its extending length and the setting of the volume ratio of the cavity are precisely specified. It is here that the third embodiment is different from the second embodiment.

The third embodiment therefore has the merit that the dimensional control upon assembly of the engine or upon production of its parts becomes easier than the first embodiment and the second embodiment. Described specifically, because the shape of the combustion chamber 3 is not precisely specified, the dimensional control of the parts making up the engine, especially of the parts defining the shape of the combustion chamber becomes easier and the control of assembling accuracy upon assembly of the engine can also become easier.

Further, even at the time of low-speed rotation or low-load operation of the engine, it is possible to promote the stratification of inducted air and fuel and hence to perform sure ignition and combustion even if the resulting air-fuel mixture is extremely lean when considered based on the whole combustion chamber 3.

Described specifically, at the time of low-speed rotation or low-load operation of the engine, fuel is injected in a compression stroke. In this case, a tumble flow is maintained until a later stage of the compression stroke in the cavity 25. It is therefore possible to concentrate the fuel in the vicinity of the spark plug 6 by making the fuel, which is injected toward the cavity 25, remain locally without allowing same to spread throughout the cavity 25. Further, layers of inducted air can also be formed around a layer of the fuel formed in the tumble flow, thereby making it possible to promote the stratification of the inducted air and the fuel.

Even if an air-fuel mixture is extremely lean when considered based on the whole combustion chamber 3, a stable combustion state can therefore be obtained so that lean-burn operation can be achieved.

Despite the lack of any precise specification on the shape of the combustion chamber 3 as described above, formation of the recess 25 of the piston 2 in a spherical shape and the top wall of the piston. 2 in a pentroof shape can bring about advantageous effects as will be described hereinafter.

Namely, when a flow of inducted air is introduced into the combustion chamber 3 through the intake port 9 arranged extending substantially upright above the intake valve 4, the flow of inducted air is allowed to flow downwardly toward the piston 2 and is then guided upwardly along the spherical cavity 25, so that a tumble flow (longitudinal swirl) is formed. By injecting fuel into the tumble flow, a stratified air-fuel mixture is formed.

Further, the formation of the top wall of the piston 2 in such a mountain shape as extending substantially along the pentroof shape of the cylinder head 8 makes it possible to reduce a space to be defined between the piston 2 and the cylinder head 8 when the piston is in its ascended position. As a consequence, the compression ratio of the engine can be increased so that its power output can be improved to a substantial extent.

Accordingly, it is possible to reduce the manufacturing cost while achieving the mutually contradictory requirements, that is, high gas mileage and high power output together at high levels.

(d) Description of the fourth embodiment

Figure 13:
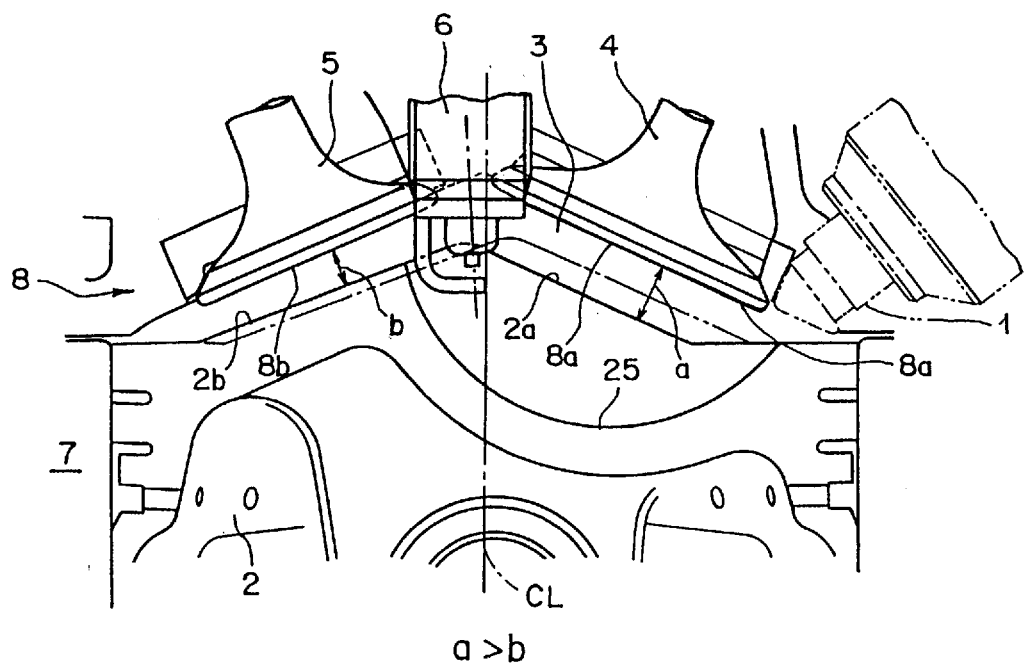
FIG. 13 is a schematic cross-sectional view showing the construction of a combustion chamber in an in-cylinder injection internal combustion engine according to a fourth embodiment of the present invention.
Figure 15:
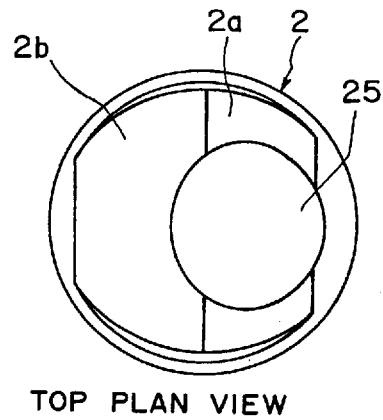
Figure 16:
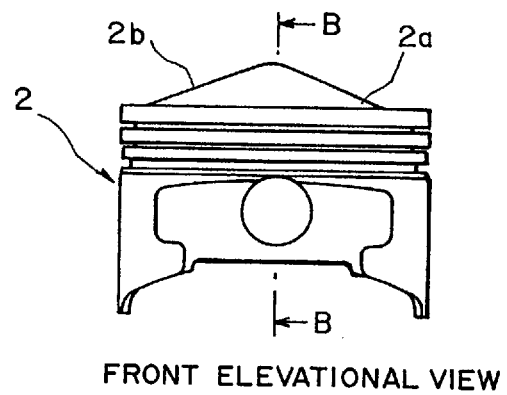
Figure 17:
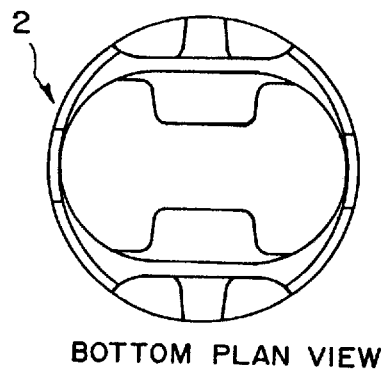
Figure 18:
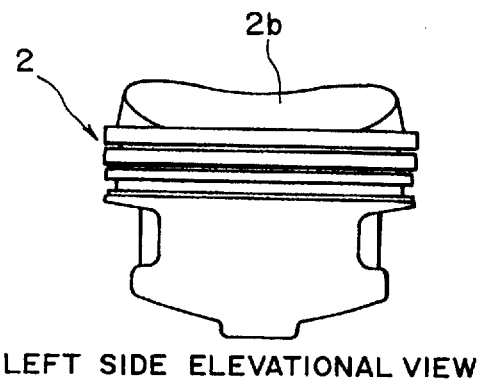
Figure 19:
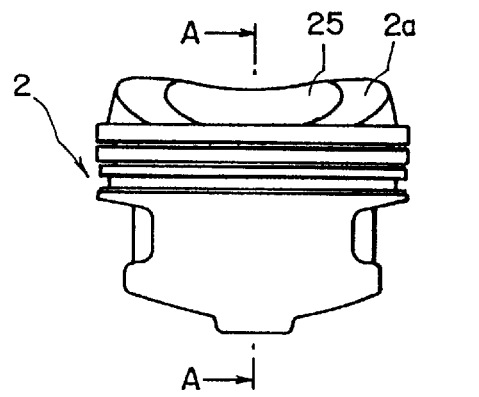
Figure 20:
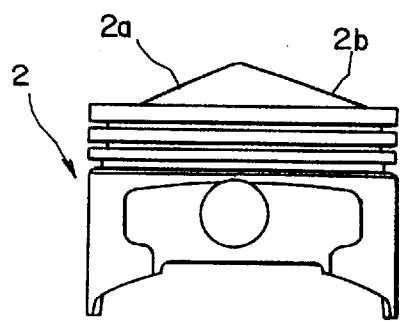
Figure 21:
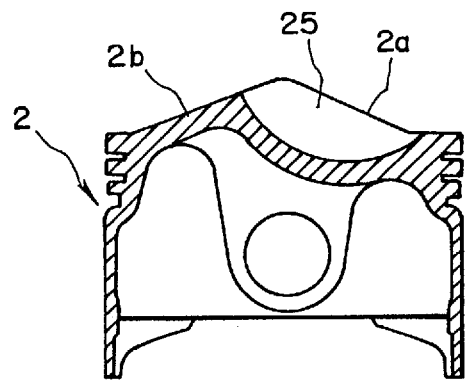
Figure 22:
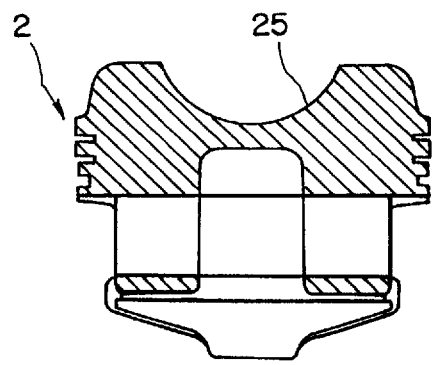
Figure 23:
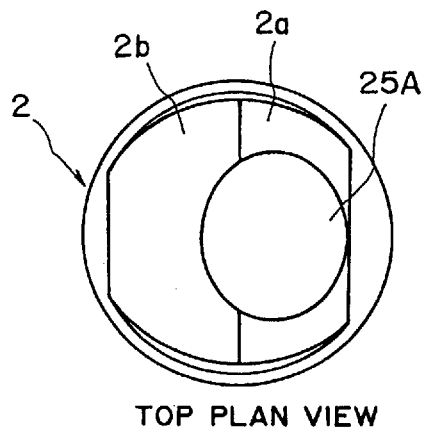
Figure 24:
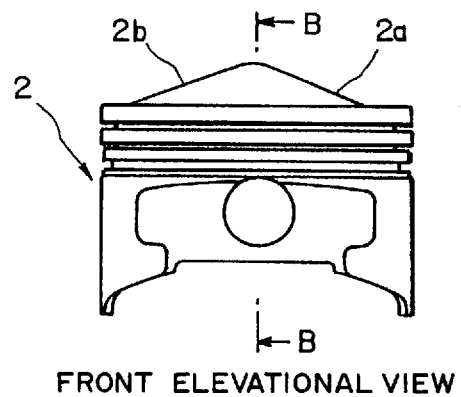
Figure 25:
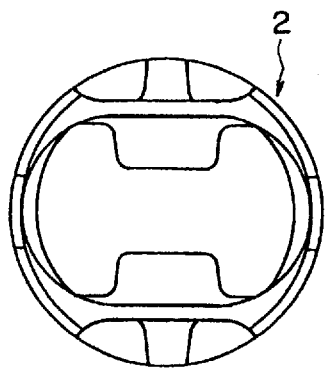
Figure 26:
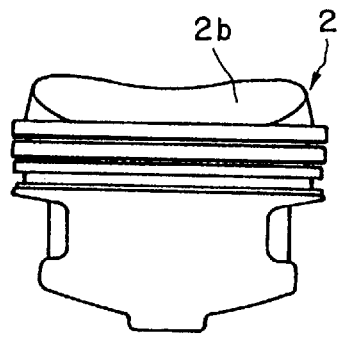
Figure 27:
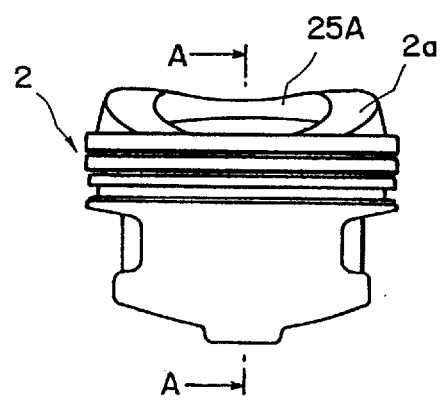
Figure 28:
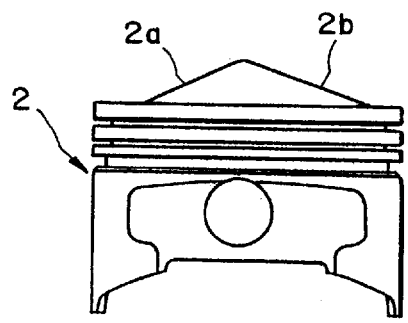
Figure 29:
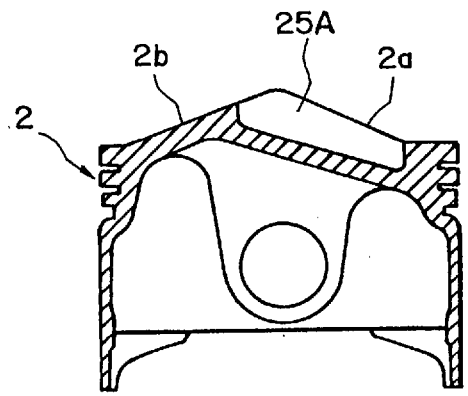
Figure 30:
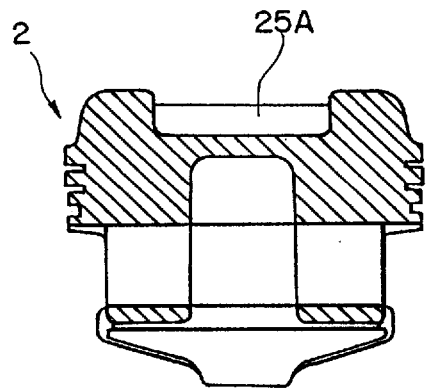
Figure 31:
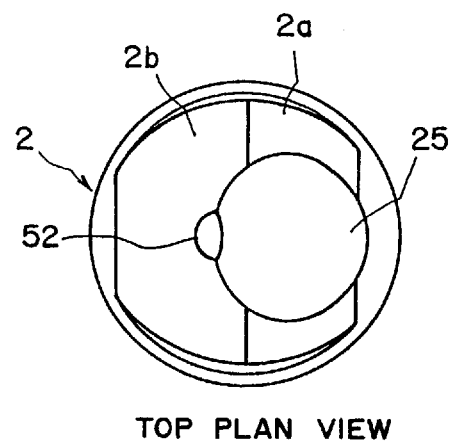
Figure 32:
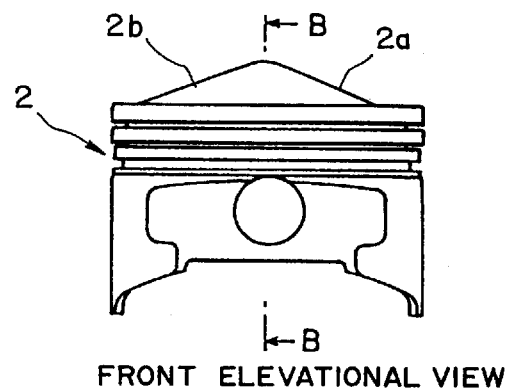
Figure 33:
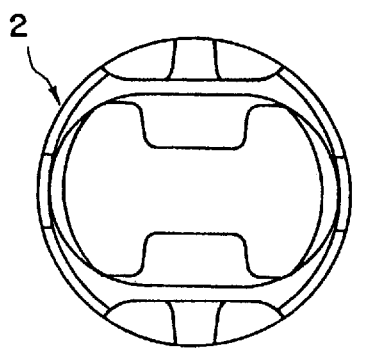
Figure 34:
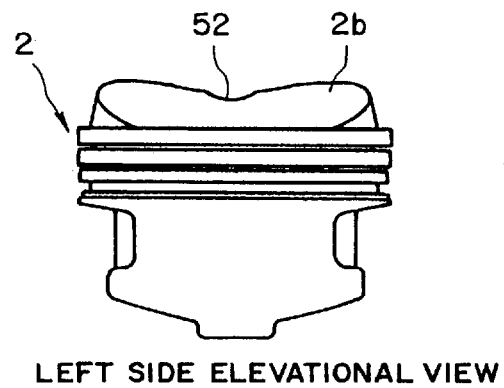
Figure 35:
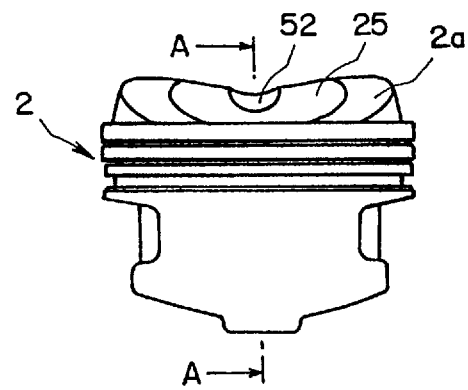
Figure 36:
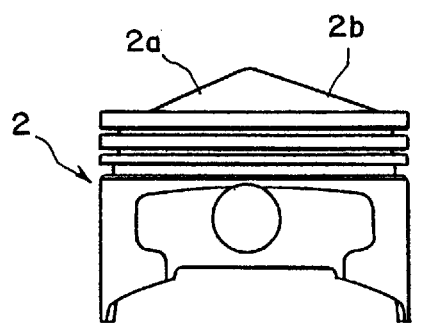
Figure 37:
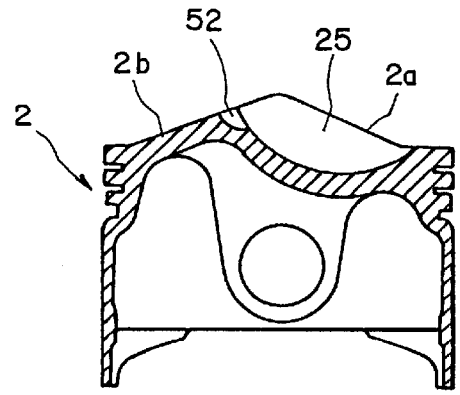
Figure 38:
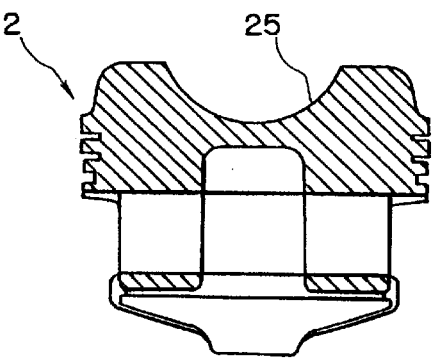
Figure 39:
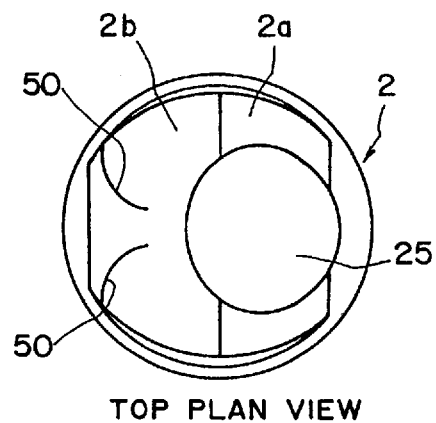
Figure 40:
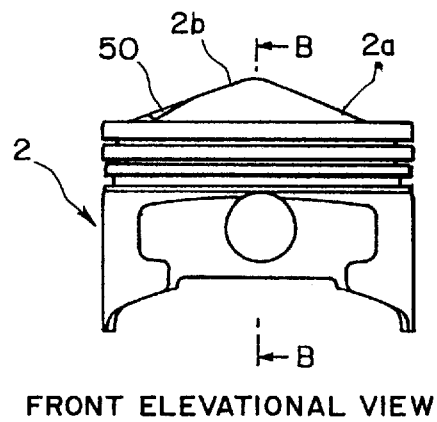
Figure 41:
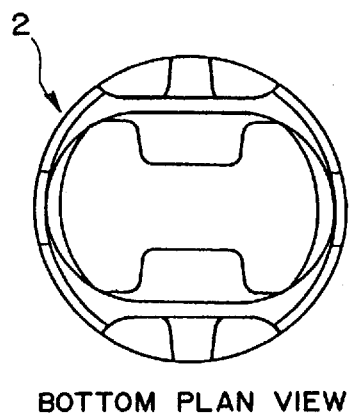
Figure 42:
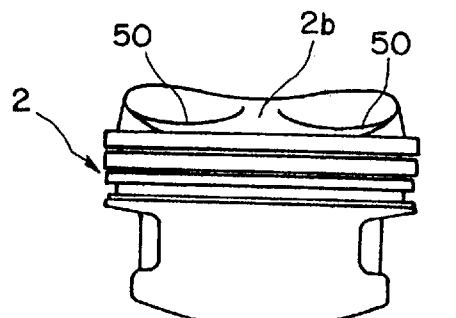
Figure 43:
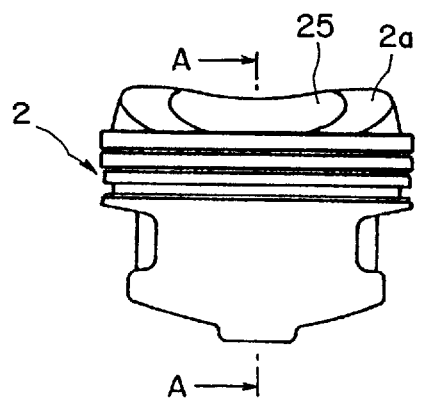
Figure 44:
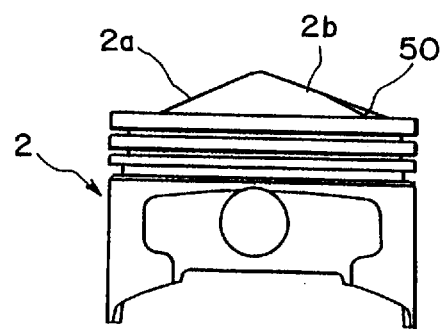
Figure 45:
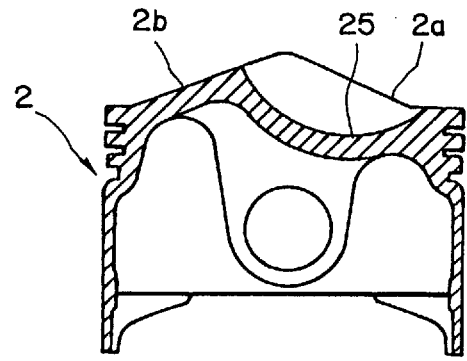
Figure 46:
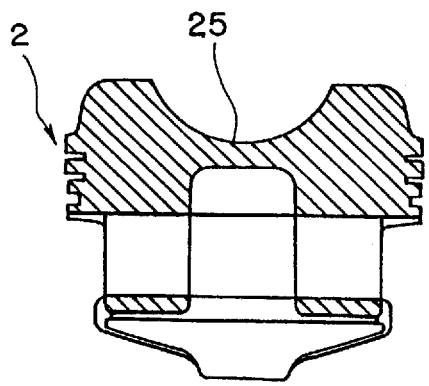
Figure 47:
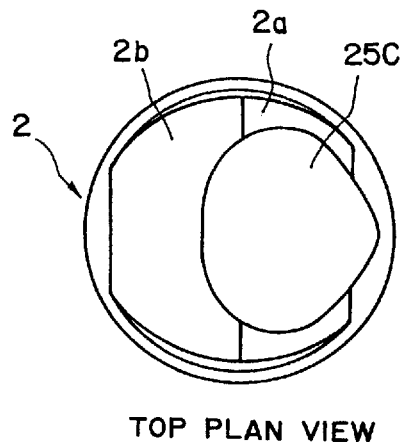
Figure 48:
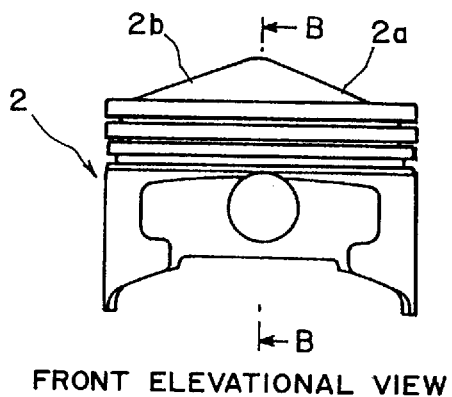
Figure 49:
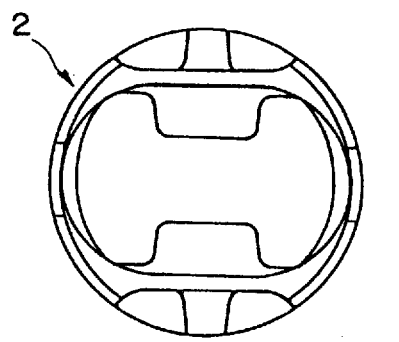
Figure 50:
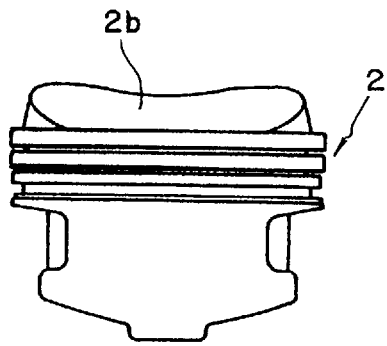
Figure 51:
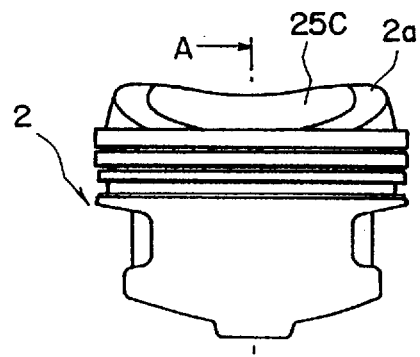
Figure 52:
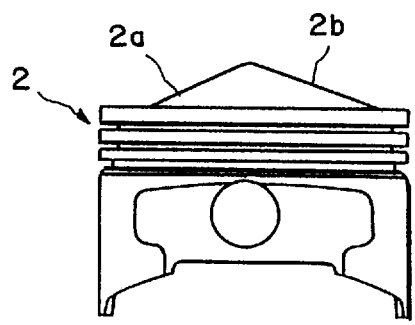
Figure 53:
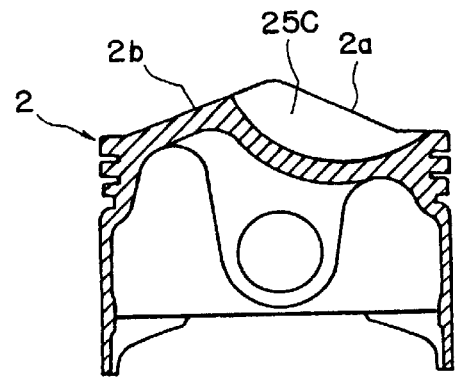
Figure 54:
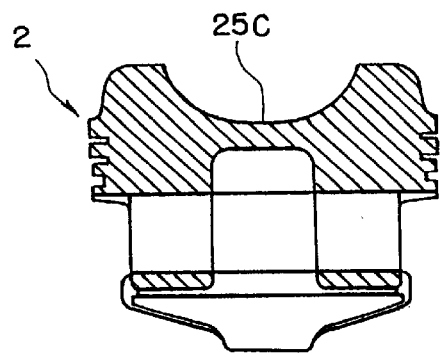

Next, a description will be made of an in-cylinder injection internal combustion engine according to a fourth embodiment of the present invention. FIG. 13 is a schematic cross-sectional view showing the shape of a combustion chamber as an essential element of the fourth embodiment, while FIG. 14 is a schematic plan view illustrating the piston as another essential element of the fourth embodiment.

In this fourth embodiment, a combustion chamber 3 is constructed substantially as in the first embodiment described above. The fourth embodiment is different from the first embodiment only in the construction to be mentioned hereinafter.

In an engine of such an in-cylinder injection type, both high power output and high gas mileage can be achieved by varying the timing of fuel injection depending on the engine speed and/or engine load. During low-speed rotation or low-load operation of the engine, in particular, lean-burn operation can be performed, that is, a high gas mileage can be achieved by injecting fuel in a compression stroke. Namely, an injection of fuel in a compression stroke makes it possible to retain a tumble flow in the cavity 25 until a later stage of the compression stroke, so that a layer of a high fuel concentration can be formed in a tumble flow around the spark plug 6 within the cavity 25 and layers of inducted air can also be formed around the fuel layer. It is therefore possible to assure ignition and to obtain a stable combustion state even if the resulting air-fuel mixture is extremely lean when considered based on the whole combustion chamber.

However, to actually achieve lean-burn operation in a stable combustion state by an injection of fuel in a compression stroke as mentioned above, it is necessary to specify in detail the shape of the combustion chamber 3 and the positions and dimensions of arrangement of the injector 1, the spark plug 6 and the like.

In this fourth embodiment, the combustion chamber 3 is hence formed as will be described below.

Described specifically, in this fourth embodiment, the clearance from a top wall of a piston 2 to a lower wall of a cylinder head 8 is different between on a side of an intake valve 4 and on a side of an exhaust valve 5 as shown in FIG. 13. Namely, the clearance is set so that a clearance a on the side of the intake valve 4 becomes greater than a clearance b on the side of the exhaust valve 5.

The difference between these clearance a and clearance b is however not very large and does not give considerably influence to the volume ratio explained above with respect to the first embodiment. Namely, the volume ratio is set to make the value of (Va+Vb)/(Va+Vb+Vc) fall within a range of from 0.4 to 0.6 as in the first embodiment, where Va represents the volume of the cavity 25, Vb means a volume between the intake-valve-side, tilted, lower wall 8a and the intake-valve-side, tilted, top wall 2a and between the exhaust-valve-side, tilted, lower wall 8b and the exhaust-valve-side, tilted, top wall 2b, and over the cavity 25 when the piston 2 is at the top dead center, and Vc denotes a volume between the intake-valve-side, tilted, lower wall 8a and the intake-valve-side, tilted, top wall 2a and between the exhaust-valve-side, tilted, lower wall 8b and the exhaust-valve-side, tilted, top wall 2b, and in a range other than an area over the cavity 25 when the piston 2 is at the top dead center.

Further, the cavity 25 is also formed in a spherical shape, because as also explained with respect to the first embodiment, the formation of the cavity 25 in the spherical shape can minimize the cavity surface area relative to the cavity volume Va of the piston 2. The minimization of the cavity surface area makes it possible to reduce the heat loss and hence to improve the combustion efficiency.

Reasons for which the clearance a on the side of the intake valve 4 is set greater than the clearance b on the side of the exhaust valve 5 will now be described.

As has been described above in detail with respect to the first embodiment, the heat loss becomes smaller and the combustion efficiency is improved, as the surface area of the combustion chamber 3 becomes smaller. It is therefore desired to make the surface area of the combustion chamber 3 smaller without changing the volume and compression ratio of the combustion chamber 3.

However, as has already been explained, the output characteristics and gas mileage performance of an in-cylinder injection internal combustion engine significantly vary depending on the shape and volume of the piston 2 or the combustion chamber 3 or the position of arrangement of the spark plug 6. There is hence the potential problem that the balance between the power output characteristics and the gas mileage performance may be impaired if the shape of the combustion chamber in the first embodiment is significantly modified.

Thus, to reduce the surface area without any substantial modification to such a shape of the combustion chamber 3 as described above with respect to the first embodiment, the fourth embodiment is constructed so that the intake-valve-side top wall 2a of the piston 2 is positioned more remote from the intake valve 4 compared with that described above with respect to the first embodiment and the exhaust-valve side top wall 2b is positioned slightly closer toward the exhaust valve 5 compared with that described above with respect to the first embodiment. Namely, in the combustion chamber 3, the intake-valve-side clearance a and the exhaust-valve-side clearance b are set to establish the relationship of a>b.

When such a construction is adopted, the surface area of the exhaust-valve-side top wall 2b of the piston 2 is not substantially changed but the intake-valve-side top wall 2a is reduced in surface area at a greater rate than the change in the surface area of the exhaust-valve-side top wall 2b.

This is attributed to the arrangement of a majority of the cavity 25 on the intake-valve side of the piston 2 as shown in FIG. 14. Namely, when the intake-valve-side top wall 2a of the piston 2 is downwardly moved, the surface of the cavity 25 (especially, the surface area extending in a vertical direction relative to the intake-valve-side top wall 2a) is reduced correspondingly. In other words, between the intake-valve-side top wall 2a and the exhaust-valve-side top wall 2b, the intake-valve-side top wall 2a undergoes a greater change in surface area when the walls move in the vertical direction, because the cavity 25 is arranged on the side of the intake valves.

Further, an area facing the lower wall of the cylinder head (see an area $S_1$ in FIG. 14) out of the surface area of the intake-valve-side top wall 2a of the piston 2 is smaller than an area facing the lower wall of the cylinder head (see an area $S_2$ in FIG. 14) out of the surface area of the exhaust-valve-side top wall 2b, because of the existence of the cavity 25. To change the intake-valve-side clearance a and the exhaust-valve-side clearance b while maintaining a compression ratio equivalent to that in the first embodiment, it is necessary, when discussed on the basis of the construction of the first embodiment, to set the distance, over which the intake-valve-side, tilted, top wall 2a is moved away from the intake valve 4, greater than the distance over which the exhaust-valve-side, tilted, top wall 2b is moved toward the exhaust valve 5. In other words, these distances are set at values such that a volume increase on the side of the intake valves 4 and a volume decrease on the side of the exhaust valves 5 are balanced. Incidentally, if it is desired to achieve by such a construction a compression ratio equivalent to that of the first embodiment, the distance over which the intake-valve-side top wall 2a has to be moved away from the intake valve 4 would be about twice as much as the distance over which the exhaust-valve-side top wall 2b is moved toward the exhaust valve 5.

By setting the intake-vale-side clearance a greater than the exhaust-valve-side clearance b as described above, the surface area of the combustion chamber 3 can be reduced further. This makes it possible to reduce the heat loss and hence to improve the combustion efficiency.

Incidentally, two-dot chain lines in FIG. 13 and FIG. 14 indicate the shape of the top wall of the piston 2 equivalent to the first embodiment.

Since the in-cylinder injection internal combustion engine according to the fourth embodiment of the present invention is constructed as described above, they have advantageous effects similar to the above-described first embodiment and moreover, such additional advantageous effects as will be described hereinafter.

Described specifically, even at the time of low-speed rotation or low-load operation of the engine, it is possible to promote the stratification of inducted air and fuel and hence to perform sure ignition and combustion even if the resulting air-fuel mixture is extremely lean when considered based on the whole combustion chamber 3. Namely, at the time of low-speed rotation or low-load operation of the engine, fuel is injected in a compression stroke. In this case, a tumble flow is maintained until a later stage of the compression stroke in the cavity 25. It is therefore possible to concentrate the fuel in the vicinity of the spark plug 6 by making the fuel, which is injected toward the cavity 25, remain locally without allowing same to spread throughout the cavity 25. Further, layers of inducted air can also be formed around a layer of the fuel formed in the tumble flow, thereby making it possible to promote the stratification of the inducted air and the fuel.

Even if an air-fuel mixture is extremely lean when considered based on the whole combustion chamber 3, a stable combustion state can therefore be obtained so that lean-burn operation can be achieved.

Namely, the setting of the intake-valve-side clearance a at a value greater than the exhaust-valve-side clearance b can further reduce the surface area of the combustion chamber 3, so that the heat loss can be reduced and the combustion efficiency can be improved. By such a construction, the combustion efficiency is increased, for example, by about 2% in the fourth embodiment than in the first embodiment.

Further, the shape of the piston 2, namely, the shape of the combustion chamber 3 that meets the inequality a>b between the intake-valve-side clearance a and the exhaust-valve-side clearance b can be applied to the above-described second embodiment. When the second embodiment is constructed so, it is also possible to reduce the surface area of the combustion chamber 3 as described above, thereby making it possible to reduce the heat loss. This can bring about the merit that the combustion efficiency can be improved.

Since the area of the intake-valve-side top wall 2a, said area facing the lower wall of the cylinder head, is still smaller compared with that in the first embodiment, the distance over which the intake-valve-side top wall 2a is moved away from the intake valve 4 can be set greater than that of the piston 2 according to the first embodiment. As a consequence, the effect for reducing the heat loss becomes more conspicuous.

(e) Description of a fifth embodiment

A description will next be made of an in-cylinder injection internal combustion engine as the fifth embodiment of the present invention.

Figure 55:
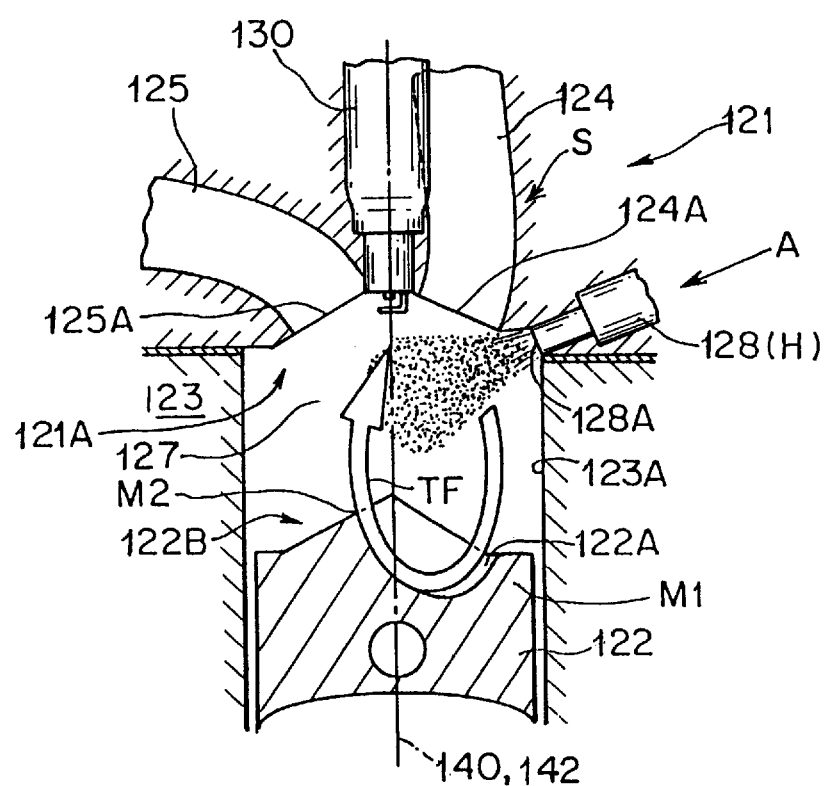
FIG. 55 is a vertical cross-sectional view schematically illustrating an interior in an in-cylinder injection internal combustion engine according to a fifth embodiment of the present invention.

As is illustrated in FIG. 55, in the construction of a combustion chamber of this in-cylinder injection internal combustion engine, an engine main body is composed of a cylinder head 121 and a cylinder block 123, and a piston 122 is fittedly inserted within a cylinder 123A of the cylinder block 123.

The cylinder head 121 of the internal combustion engine is constructed as a 4-valve internal combustion engine in which each cylinder is provided at one side of a lower wall thereof with two intake valves and at an opposite side of the same wall with two exhaust valves.

Between a top wall of the piston 122 and the lower wall 121 of the cylinder head, the combustion chamber 127 is formed.

Through the lower wall 121A of the cylinder head, an intake port 124 and an exhaust port 125 are connected in communication with the combustion chamber 127 via an intake opening 124A and an exhaust opening 125A, respectively.

In the intake and exhaust openings 124A,125A of these intake port 124 and exhaust port 125, unillustrated intake and exhaust valves are arranged, respectively, so that the intake and exhaust openings 124A,125A are opened or closed by these intake and exhaust valves.

Figure 58:
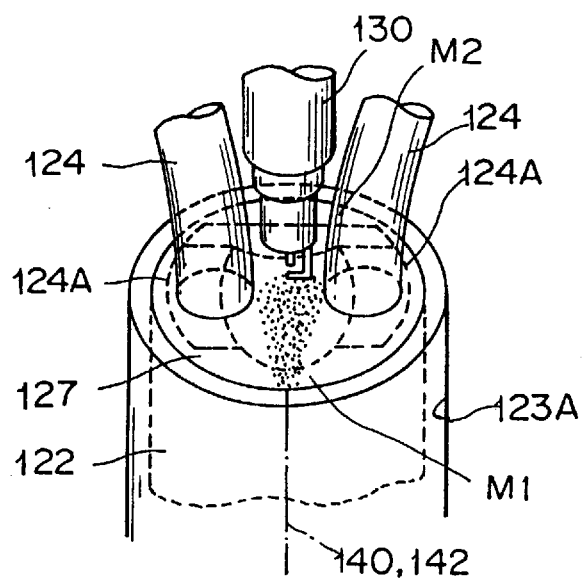
FIG. 58 is a view of the in-cylinder injection internal combustion engine according to the fifth embodiment of the present invention as viewed in the direction of arrow A in FIG. 55.

This combustion chamber 127 is formed as shown in FIG. 55, FIG. 56 and FIG. 58. Centering around such an imaginary plane 140 as containing a central axis 142 of the cylinder 124A and an axis of an unillustrated crankshaft, the lower wall 121A of the cylinder head is formed in the shape of a pentroof consisting of an intake-valve-side, tilted, lower wall formed on one side of the imaginary plane 140 and an exhaust-valve-side, tilted, lower wall formed on an opposite side of the imaginary plane 140. Further, the top wall of the piston 122 is formed in the shape of a pentroof having an intake-valve-side, titled, top wall formed on the one side of the imaginary plane 140 and an exhaust-valve-side, tilted, top wall formed on the opposite side of the imaginary plane 140 so that they correspond to the intake-valve-side, tilted, lower wall and the exhaust-valve-side, tilted, lower wall, respectively.

In the cylinder head 121, the two intake ports 124 are arranged on the one side of the imaginary plane 140 whereas the two exhaust ports 125 are disposed on the opposite side of the imaginary plane 140.

Further, as is depicted in FIG. 55 and FIG. 58, a spark plug 130 is arranged centrally in a top part of the combustion chamber 127, namely, in or near the imaginary plane 140.

The two intake ports 124 are arranged extending substantially upright in the cylinder head 121, and the intake openings 124A of the intake ports 124 are disposed so that they downwardly face in the vicinity of the imaginary plane 140.

For supplying fuel into the combustion chamber 127, an injector 128 as a fuel injection means H is arranged in a side wall of the cylinder head on a side of the intake ports 124.

This injector 128 is arranged so that an injection nozzle 128A formed at a free end thereof faces the combustion chamber 127 through the side wall of the cylinder head 121, whereby fuel is injected directly into the combustion chamber 127.

The injector 128 is designed to be controlled, for example, by an unillustrated controller so that fuel is injected in a predetermined quantity at a predetermined injection timing.

As will be described in detail subsequently herein, the controller performs the control so that at least in a low-load and low-rotation range, fuel is injected in a later stage of a compression stroke to form a reversed tumble flow of a rich air-fuel mixture around the spark plug but in a high-load range and in a high-rotation range, fuel is injected from an early stage of an intake stroke to form a uniform air-fuel mixture in the combustion chamber.

Now describing about a mounting portion for the injector 128, the two intake ports 124 are arranged extending substantially upright from the cylinder head 121 as described above so that a sufficient space can be retained around the openings 124A of the intake ports 124 for mounting the injector 128.

The arrangement of the spark plug 130 in or around the imaginary plane 140 has also brought about substantial freedom for setting the position of arrangement of the injector 128, thereby making it possible to arrange the injector 128 at a position optimal for the injection of fuel.

Although not illustrated in any drawing, it is possible to effectively cool fuel, which is to be injected into the injector 128 and the combustion chamber 127, by arranging a coolant passage around the injector 128 mounted in the cylinder head.

As has been described above, the piston 122 is fittedly inserted within the cylinder 123A. As is shown in FIG. 55 and FIG. 56, this piston 122 defines a recessed portion 122A formed in a pentroof-shaped raised portion 122B which is composed of the intake-valve-side, tilted, top wall and the exhaust-valve-side, tilted, top wall on a top portion of the piston.

This recessed portion 122A is arranged in the top portion of the piston 122 at a part thereof located underneath the intake openings 124A, and is formed by a downwardly convex, curved surface so that the tilted walls of the raised portion 122B are cut off downwardly.

Namely, this recessed portion 122A is arranged at a position off-centered from the imaginary plane 140 toward the side of the intake openings 124A and, as shown by way of example in FIG. 56, is formed in a spherical shape which is curved in a downwardly convex form.

As a consequence, when the piston 122 has reached the end of a compression stroke, a compact combustion chamber 127A is defined in a form surrounded by the recessed portion 122A of the piston 122, an inner wall of the cylinder 123A and the lower wall of the cylinder head 121 as illustrated in FIG. 59.

Figure 57:
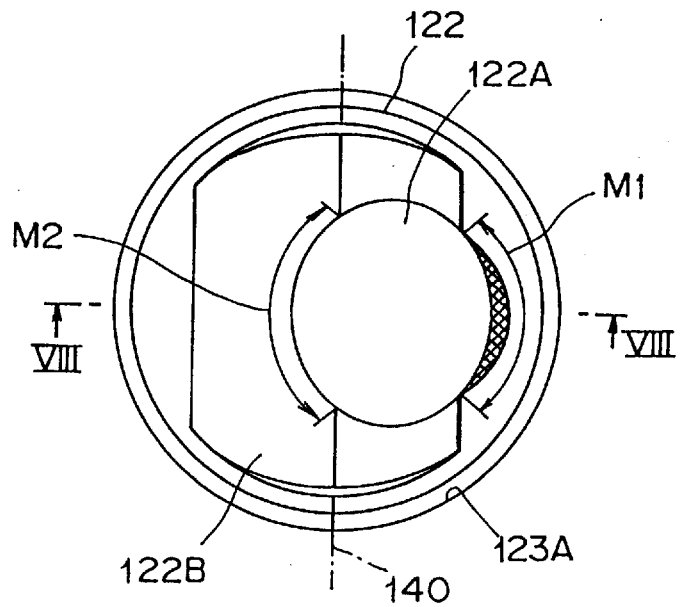
FIG. 57 is a transverse cross-sectional view showing a cross-section of the in-cylinder injection internal combustion engine according to the fifth embodiment of the present invention cut by a plane along line 57—57 of FIG. 56.

As shown in FIG. 55 to FIG. 57, an inlet side of a peripheral edge of the recessed portion 122A for a vertical swirl is formed as a tilted portion in a gently rounded portion M1 in a range indicated by an arrow, and a corner portion at which the tilted wall of the raised portion 122B on the side of the exhaust openings 125A and the inner wall of the recessed portion 122A meet each other, said corner portion serving as an outlet side of the peripheral edge of the recessed portion for the vertical swirl, is formed in a sharp edge portion M2 in a range indicated by an arrow.

The corner portion of the recessed portion 122A on the inlet side for the vertical swirl is therefore formed less sharp than the corner portion on the outlet side for the vertical swirl.

Further, as is illustrated in FIG. 59, a squishing area 122C is formed between the raised portion 122B of the top wall of the piston 122 and the side of the exhaust openings 125A above the combustion chamber 127.

As a consequence, as is shown in FIG. 55, FIG. 56 and FIG. 59, a flow of inducted air which has flowed in through the intake ports 124 flow toward the piston 122 located in a lower part of the inside of the cylinder 123A. At the recessed portion 122A of the piston 122, the flow of inducted air is guided from the side of the rounded portion M1 on the inlet side for the vertical swirl and then along the inner wall of the recessed portion 122A. By the sharp edge portion M2 on the outlet side for the vertical swirl, the vertical swirl is then effectively separated and is allowed to flow upwards, so that a reversed tumble flow TF which is a vertical swirl is formed.

In the combustion chamber 127, the flow of inducted air therefore promotes the formation of the reversed tumble flow TF along the recessed portion 122A.

The injector 128 is controlled by an unillustrated controller so that fuel is injected in a predetermined quantity at a predetermined timing.

Figure 60:
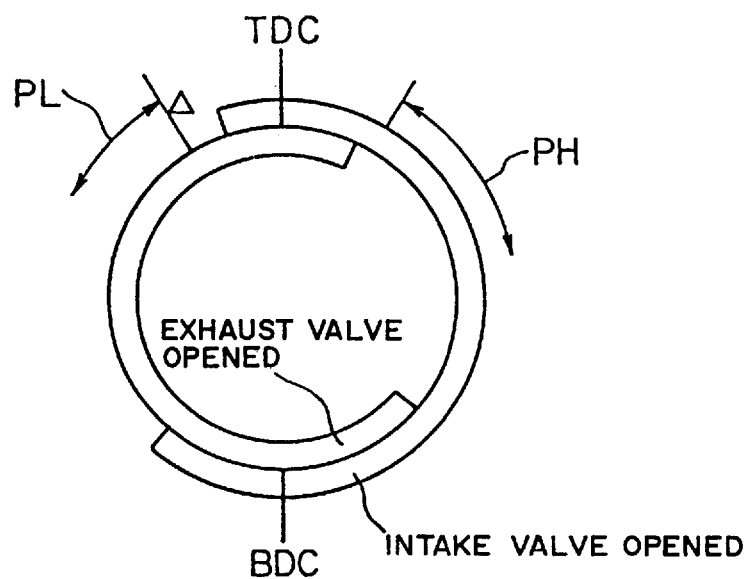
FIG. 60 is an illustration showing a drive cycle of the 4-cycle engine in the in-cylinder injection internal combustion engine according to the fifth embodiment of the present invention.

In such an internal combustion engine, for example, in the case of a 4-cycle engine, an intake valve is opened before TDC (an abbreviation of Top Dead Center), that is, 0° and upon entrance to an intake stroke, an exhaust valve is closed past TDC, i.e., 0° to complete the exhaust stroke of the preceding cycle, as shown in FIG. 60. The piston 122 thereafter descends up to 180° in terms of crank angle, during which the reversed tumble flow TF is formed as shown in FIG. 55 and FIG. 59. Into this reversed tumble flow TF, fuel is injected from the injector 128 at a predetermined injection timing such as in an intake stroke or in a later stage of a compression stroke.

When a predetermined ignition time before TDC, i.e., 360° is then reached, an unillustrated ignition circuit is driven to initiate an ignition processing (shown by a Δ mark in FIG. 60) by the spark plug 130. By this ignition processing, injected fuel is ignited to burn so that the in-cylinder pressure of the combustion chamber 127 arises. The piston 122 is therefore pushed down to produce an output, and a combustion stroke is performed until close to 540° in terms of crank angle, that is, BDC (an abbreviation of Bottom Dead Center).

Near a crank angle of 480°, the exhaust valve is opened and an exhaust stroke is continued until the crank angle exceeds 720°, whereby an opening operation of the intake valve for the next intake stroke is performed to complete the 4 cycles.

The injection timing for the injector 128 of the 4-cycle engine is controlled so that, in one example shown in FIG. 60, the injector is driven to perform injection at a predetermined injection time PH in an early stage of an intake stroke when the engine is in a high-load range or in a high-speed rotation range but is driven to perform injection at a predetermined injection time PL in a later stage of the compression stroke when the engine is in a low-load low-speed rotation range.

Here, it is possible to promote homogenization of fuel mixing and hence to ensure realization of smooth and prompt burning in a high-load range and at the time of high rotation by starting mixing of fuel with air in the form of the reversed tumble flow TF at an early stage and also enhancing agitation of an air-fuel mixture as a result of breakage of the tumble flow in the later stage of the compression stroke.

At the time of-low-load and low-speed rotation, on the other hand, the injection of fuel is delayed, for example, to a later stage of the compression stroke to await the formation of the compact combustion chamber 127A. Here, an injection of fuel is performed toward the recessed portion 122A so that the fuel is guided to and around the spark plug 130. A reversed tumble flow of a rich air-fuel mixture is therefore formed around the spark plug 130, thereby making it possible to sufficiently assure stable ignition owing to stratified combustion.

The description has been made about the 4-cycle engine. The present invention may also be applied to a 2-cycle gasoline engine instead of the 4-cycle engine.

In this case, as the construction of a main body of the engine, a construction similar to that described above can be employed.

Figure 61:
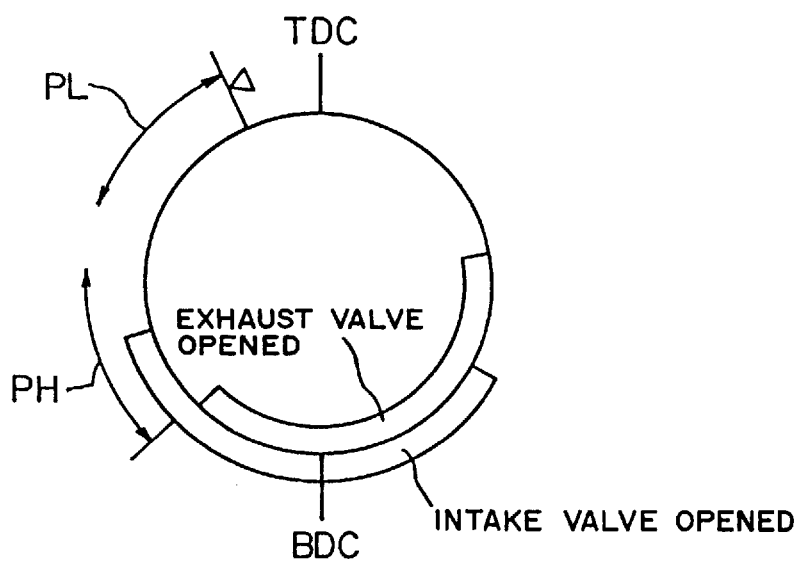
FIG. 61 is an illustration showing a drive cycle when the in-cylinder injection internal combustion engine according to the fifth embodiment of the present invention was applied to a 2-cycle engine.
Figure 63:
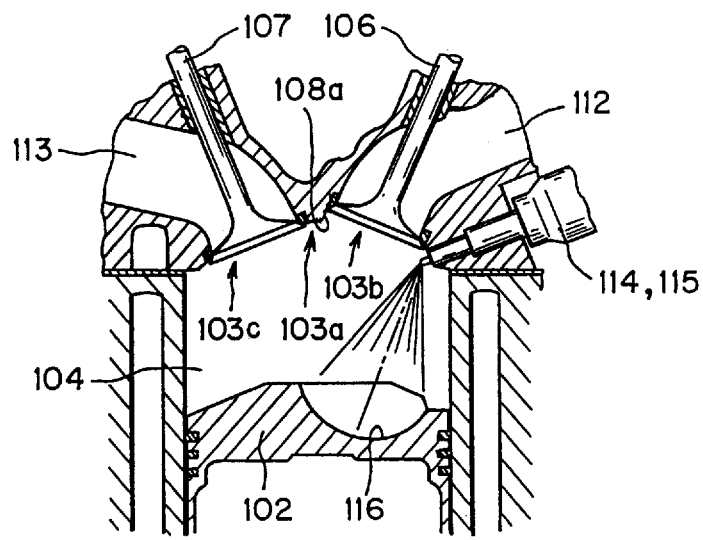
FIG. 63 and FIG. 64 are drawings both illustrating a conventional technique.
Figure 64:
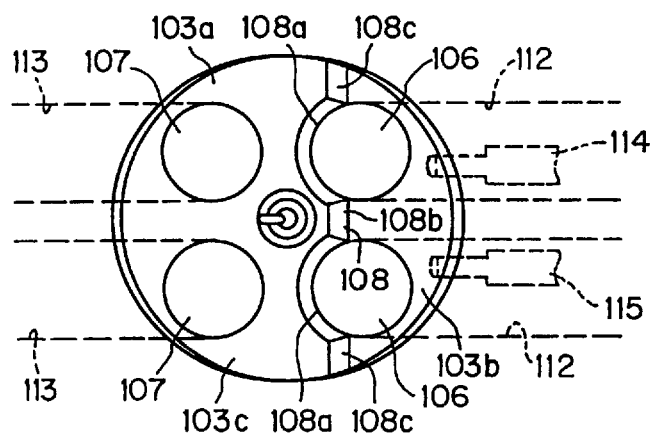

In the case of the 2-cycle engine, as is shown in FIG. 61, a preceding combustion stroke is performed from TDC, that is, 0°, an unillustrated exhaust valve is opened near a crank angle of 90° to enter an exhaust stroke, and when the cycle reaches near a crank angle of 120°, an unillustrated intake valve is opened to also enter an intake (scavenging) stroke.

Further, after BDC, the exhaust valve is closed shortly ahead of a crank angle of 230° or near this point, and the intake valve is closed shortly ahead of a crank angle 270° or near this point to enter a compression stroke. Then, the injector 128 is driven to inject fuel at a predetermined injection timing in an intake stroke or a compression stroke.

When a predetermined ignition time before TDC is reached, an unillustrated ignition circuit is driven to initiate an ignition processing (shown by a Δ mark in FIG. 61) by the spark plug 130. By this ignition processing, injected fuel is ignited to burn so that the in-cylinder pressure of the combustion chamber 127 arises. The piston 122 is therefore pushed down to produce an output.

Here, the injector 128 is controlled so that, for example, it is driven to perform injection only for a predetermined injection time PH when the engine is under a high load or in high-speed rotation but is driven to perform injection only for a predetermined injection time PL when the engine is in low-load and low-speed rotation.

This makes it possible to promote homogenization of fuel mixing and hence to ensure realization of smooth and prompt burning at the time of a high load and at the time of high rotation by starting mixing of fuel with air in the form of the reversed tumble flow TF at an early stage and also enhancing agitation of an air-fuel mixture as a result of breakage of the tumble flow in the later stage of the compression stroke.

At the time of low-load and low-speed rotation, on the other hand, the injection of fuel is delayed to await the formation of the compact combustion chamber 127A. Here, an injection of fuel is performed toward the recessed portion 122A so that the fuel is guided to and around the spark plug 130. A reversed tumble flow of a rich air-fuel mixture is therefore formed around the spark plug 130, thereby making it possible to sufficiently assure stable ignition owing to stratified combustion.

As the combustion chamber of the in-cylinder injection internal combustion engine according to the fifth embodiment of the present invention is constructed as described above, a flow of inducted air enters the combustion chamber 127 from each intake port 124 through its corresponding intake opening 124A in an intake stroke of the engine.

Since the injector 128 is arranged with its injection nozzle 128A facing the combustion chamber 127 and is controlled by the unillustrated controller, fuel is injected at an appropriate timing and is then mixed with air inducted correspondingly to the timing of injection, whereby a stratified air-fuel mixture or a homogeneous air-fuel mixture is formed.

A vertical swirl, which has flowed in from an upper part toward a lower part of the combustion chamber 127, advances to an inner wall of the recessed portion 122A through the gently rounded portion M1 which is located on the top wall of the piston 122 and on the inlet side of the recessed portion 122A, flows along a bowed surface of the inner wall of the recessed portion 122A, and by the sharp edge portion M2 at the corner portion of the tilted wall of the raised portion 122B, is allowed to effectively separate from the raised portion 122B, whereby the vertical swirl changes its direction toward the upper part of the combustion chamber 127.

In other words, the intake openings 124A are arranged on the one side of the cylinder head 121 relative to the imaginary plane 140, and the recessed portion 122A is disposed below the intake openings 124A so that they oppose each other. A flow of inducted air therefore flows in toward the wall of the cylinder 123A on the side of the intake openings 124A, i.e., the recessed portion 122A, is guided by the curved surface of the recessed portion 122A and further by the bowed surface of the recessed portion 122A, and becomes an upward flow directed toward the central part of the lower wall 121A of the cylinder head or its vicinity area.

Because the lower wall 121A of the cylinder head is formed in the pentroof shape, the vertical swirl of the inducted air again flows in toward the wall of the cylinder 123A on the side of the intake openings 124A and advances toward the recessed portion 122A, whereby a strong reversed tumble flow TF is formed.

Since the intake ports 124 extend in the vertical direction alongside the imaginary plane 140 in the cylinder head 121, the flow of inducted air flowing from the intake port 124 into the combustion chamber 127 is facilitated to downwardly flow in along the cylinder wall 123A on the side of the intake openings 124A and also to be introduced as a strong flow of inducted air directed to a lower part (toward the piston 122). The formation of a strong vertical swirl is therefore rendered easier.

Further, the recessed portion 122A is formed at least at the inlet side thereof for a vertical swirl into the gently rounded portion M1 and at least at the outlet side thereof for the vertical swirl into the sharp edge portion M2.

As a result, the formation of the outlet side for the vertical swirl into the edge shape M2 permits easy separation of the flow of inducted from the recessed portion 122A and inversion of the flow of inducted air along the bowed surface in the recessed portion 122A. The flowing speed is enhanced so that the reversed tumble flow can be maintained until a later stage of a compression stroke.

As a consequence, when fuel is supplied into the compact combustion chamber 127A formed in the later stage of the compression stroke, specifically into the recessed portion 122A, for example, at the time of low-load and low-speed rotation so that the fuel is allowed to flow toward the spark plug 130, the injected fuel remains as a reversed tumble flow of a relatively rich air-fuel mixture around the spark plug 130 in the recessed portion 122A while minimizing flowing and mixing of the fuel into the squishing area 122C, and a stratified reversed tumble flow is also formed by a reversed tumble flow of a superlean air-fuel mixture located apart from the spark plug 130. By performing stratified combustion, stable combustion is achieved despite it is a lean air-fuel mixture as a whole. It is therefore possible to improve the gas mileage.

It is therefore possible to avoid such inconvenience that the injected fuel may flow to the side of the squishing area 122C and may then be exhausted as unburned gas and accordingly, the gas mileage is lowered or the exhaust gas is deteriorated.

Owing to the formation of the inlet side for the vertical swirl into the gently rounded portion M1, heat of combustion does not act in a concentrated manner at least on the corner portion at the opening edge portion on the side of the inlet for the vertical swirl, so that no heat point is formed. Further, the formation of the corner portion into the gently rounded shape, the surface area of the top wall of the piston can be reduced. The heat loss which has remained as inconvenience to date as described above can be reduced, thereby making it possible to provide engines of higher output.

In the above-described fifth embodiment, the description was made about the construction that the tilted portion was formed into the gently rounded portion M1 as shown in FIG. 62(*a*). The tilted portion is however not limited to such a construction. Similar advantages as the above-described embodiment can still be exhibited, insofar as the corner portion on the inlet side for the vertical flow of the recessed portion 122A, said corner portion tending to become a heat point, is removed and the tilted portion is formed into such a shape as reducing the surface area of the top wall of the piston 122, for example, by cutting off and chamfering the tilted portion along a plane to form a single tilted wall as shown in FIG. 62(*b*), forming the tilted portion into plural tilted walls arranged in the flow-in direction of the vertical swirl, or combining the tilted wall with a rounded shape.

In the drawings of the above-described embodiment, the gently rounded portion M1 as the tilted portion was formed so that its size became gradually smaller toward opposite ends thereof at the inlet side of the peripheral edge of the recessed portion as viewed in the direction of the axis of the crankshaft of the internal combustion engine. The gently rounded portion M1 can however be formed in the same size therethroughout. In this case, similar advantages as those of the above-described embodiment can also be brought about.

According to the present invention, the compression ratio can be set high. This invention is therefore suited for use in an in-cylinder injection internal combustion engine which is of the spark ignition type and performs injection of fuel directly into a combustion chamber.

What is claimed is:

1. An in-cylinder injection internal combustion engine comprising:

a combustion chamber including a top and a bottom thereof defined by a lower wall of a cylinder head and a top wall of a piston fittedly inserted within said cylinder;

an intake valve arranged on one side of said lower wall of said cylinder head;

an exhaust valve arranged on an opposite side of said lower wall of said cylinder head;

an intake passage communicating at one end thereof to said combustion chamber through said intake valve so that inducted air is fed into said combustion chamber;

an exhaust passage communicating at one end thereof to said combustion chamber through said exhaust valve so that combustion gas in said combustion chamber is exhausted; and a fuel injection valve arranged for directly injecting fuel into said combustion chamber said fuel injection valve being controlled by an injection controller;

wherein said lower wall of said cylinder head, said lower wall forming an upper wall of said combustion chamber, is configured in the form of a pentroof having an intake-valve-side, tilted, lower wall formed on said one side and an exhaust-valve-side, tilted, lower wall formed on said opposite side, a spark plug having a downwardly extending electrode is arranged in a vicinity of a top portion of said pentroof-shaped upper wall of said combustion chamber, said top wall of said piston, said top wall forming a lower wall of said combustion chamber, is configured in the form of a pentroof having an intake-valve-side, tilted, top wall and an exhaust-valve-side, tilted, top wall, which are formed corresponding to said intake-valve-side, tilted, lower wall and said exhaust-valve-side, tilted, lower wall, respectively, said injection controller controls fuel injection for injecting fuel, during low-load operation range, primarily in a later stage of a compression stroke, and, during high-load operation range, primarily in an intake stroke;

said intake-valve-side, tilted, top wall of said top wall of said piston is provided with a recessed portion; and said intake valve, said fuel injection valve, and said electrode being so positioned relative to said recessed portion of said piston and said recessed portion being so structured as to promote, even during compression, tumble flow of inducted air in the combustion chamber with stratification of inducted air and fuel thereby assuring ignition and enabling lean burning at low-load operation.

2. An in-cylinder injection internal combustion engine according to claim 1, wherein said fuel injection valve is arranged so that, when said piston is located in a vicinity of a top dead center, injection fuel is directed toward an inside of said recessed portion.

3. An in-cylinder injection internal combustion engine according to claim 1, wherein said recessed portion is formed so that a cross-sectional shape thereof along a flowing direction of a flow of inducted air introduced into said combustion chamber is in a form of a circular arc.

4. An in-cylinder injection internal combustion engine according to claim 1, wherein said top wall of said piston includes a planar portion being formed at least at an outer peripheral portion of said intake-valve-side, tilted, top wall.

5. An in-cylinder injection internal combustion engine according to claim 4, wherein said recessed portion includes:
a flow-in portion formed gently descending from said planar portion so that a flow of inducted air, which has been introduced into said combustion chamber, flows into said recessed portion,
a raised portion rising smoothly to guide said flow of inducted air, which has flowed into said recessed portion, from an inside of said recessed portion toward a vicinity of said spark plug, and
a connecting portion being formed as a substantially planar surface, said connecting portion smoothly connecting said flow-in portion and said raised portion.

6. An in-cylinder injection internal combustion engine according to claim 4, wherein said recessed portion is formed extending from said intake-valve-side, tilted, top wall to said planar portion beyond a lower extremity of said intake-valve side, tilted, top wall.

7. An in-cylinder injection internal combustion engine according to claim 6, wherein said recessed portion is formed as a part of an imaginary spherical surface having a center thereof at a point above said intake-valve-side, tilted, top wall so that said lower extremity of said intake-valve-side, tilted, top wall of said piston is included within said imaginary spherical surface.

8. An in-cylinder injection internal combustion engine according to claim 7, wherein, when said piston is located near a top dead center, an injection nozzle of said fuel injection valve and a valve element of said intake valve are both included within said imaginary spherical surface.

9. An in-cylinder injection internal combustion engine according to claim 1, wherein, when said piston is located near a top dead center, a ground electrode of said spark plug is included within said recessed portion.

10. An in-cylinder injection internal combustion engine according to claim 9, wherein said spark plug is arranged so that, when said piston is located near a top dead center, said ground electrode of said spark plug is located close to an inner surface of said recessed portion.

11. An in-cylinder injection internal combustion engine according to claim 1, wherein said lower wall of said cylinder head includes a bulged portion for mounting said spark plug.

12. An in-cylinder injection internal combustion engine according to claim 1, wherein, when said piston is located near a top dead center, a clearance between said exhaust-valve-side, tilted, lower wall of said cylinder head and said exhaust-valve-side, tilted, top wall of said piston in a vicinity of said exhaust valve is set smaller than a clearance between said intake-valve-side, tilted, lower wall of said cylinder head and said intake-valve-side, tilted top wall of said piston in a vicinity of said intake valve.

13. An in-cylinder injection internal combustion engine according to claim 1, wherein said intake passage is constructed so that a flow of inducted air, which has been introduced into said combustion chamber through said intake valve, is formed as a longitudinal swirl directed toward said top wall of said piston.

14. An in-cylinder injection internal combustion engine according to claim 13, wherein said intake passage is arranged on one side of an imaginary plane extending parallel to a crankshaft axis and passing through a central axis of said piston, and is arranged extending vertically alongside said imaginary plane in said cylinder head.

15. An in-cylinder injection internal combustion engine according to claim 1, wherein said exhaust-valve-side, tilted, top wall of said piston includes a groove thereon for providing a space between said exhaust-valve-side, tilted, top wall and said exhaust valve.

16. A method for controlling an in-cylinder injection internal combustion engine, said engine comprises: a combustion chamber including a top and a bottom thereof defined by a lower wall of a cylinder head and a top wall of a piston fittedly inserted within said cylinder; an intake valve arranged on one side of said lower wall of said cylinder head; an exhaust valve arranged on an opposite side of said lower wall of said cylinder head; an intake passage communicating at one end thereof to said combustion chamber through said intake valve so that inducted air is fed into said combustion chamber; an exhaust passage communicating at one end thereof to said combustion chamber through said exhaust valve so that combustion gas in said combustion chamber is exhausted, and a fuel injection valve arranged for directly injecting fuel into said combustion chamber, wherein said lower wall of said cylinder head, said lower wall forming an upper wall of said combustion chamber, is configured in the form of a pentroof having an intake-valve-side, tilted, lower wall formed on said one side and an exhaust-valve-side, tilted, lower wall formed on said opposite side, wherein a spark plug is arranged in a vicinity of a top portion of said pentroof-shaped upper wall of said combustion chamber, wherein said top wall of said piston, said top wall forming a lower wall of said combustion chamber, is configured in the form of a pentroof having an intake-valve-side, tilted, top wall and an exhaust-valve-side, tilted, top wall, which are formed corresponding to said intake-valve-side, tilted, lower wall and said exhaust-valve-side, tilted, lower wall, respectively, and wherein said intake-valve-side, tilted, top wall of said top wall of said piston is provided with a recessed portion, said method comprising:
switching a fuel injection timing between a compression-stroke-injection and an intake-stroke injection in response to an operating condition of said engine; and
controlling fuel quantity injected by said injector into said combustion chamber so that an air-fuel mixture leaner than a stoichiometric air/fuel ratio is formed when said compression-stroke-injection is carried out and an air-fuel mixture equivalent to said stoichiometric air/fuel ratio is formed when said intake-stroke-injection is carried out.

17. The method for controlling an in-cylinder injection internal combustion engine according to claim 16, wherein said compression-stroke-injection is carried out when said engine is operated at low-load and low-speed condition, and said intake-stroke-injection is carried out when said engine is operated at high-load and high-speed condition.

18. An in-cylinder injection internal combustion engine comprising:
a combustion chamber including a top and a bottom thereof defined by a lower wall of a cylinder head and a top wall of a piston fittedly inserted within said cylinder;
an intake valve arranged on one side of said lower wall of said cylinder head;
an exhaust valve arranged on an opposite side of said lower wall of said cylinder head;
an intake passage communicating at one end thereof to said combustion chamber through said intake valve so that inducted air is fed into said combustion chamber;
an exhaust passage communicating at one end thereof to said combustion chamber through said exhaust valve so that combustion gas in said combustion chamber is exhausted; and
a fuel injection valve arranged for directly injecting fuel into said combustion chamber;
wherein said lower wall of said cylinder head, said lower wall forming an upper wall of said combustion chamber, is configured in the form of a pentroof having an intake-valve-side, tilted, lower wall formed on said one side and an exhaust-valve-side, tilted, lower wall formed on said opposite side,
a spark plug is arranged in a vicinity of a top portion of said pentroof-shaped upper wall of said combustion chamber,
said top wall of said piston, said top wall forming a lower wall of said combustion chamber, is configured in the form of a pentroof having an intake-valve-side, tilted, top wall and an exhaust-valve-side, tilted, top wall, which are formed corresponding to said intake-valve-side, tilted, lower wall and said exhaust-valve-side, tilted, lower wall, respectively, and
said intake-valve-side, tilted, top wall of said top wall of said piston is provided with a recessed portion, said recessed portion including two spherical surfaces with centers thereof offset from each other, and a connecting surface smoothly connecting said two spherical surfaces.

19. An in-cylinder injection internal combustion engine according to claim 18, wherein said centers of said two spherical surfaces are arranged at positions so that in a top plan view of said piston, said centers are offset relative to a plane which extends at a right angle relative to a direction of arrangement of a piston pin and passes through a central axis of said cylinder, in directions away from said plane by a same distance.

20. An in-cylinder injection internal combustion engine comprising:
a combustion chamber including a top and a bottom thereof defined by a lower wall of a cylinder head and a top wall of a piston fittedly inserted within said cylinder;
an intake valve arranged on one side of said lower wall of said cylinder head;
an exhaust valve arranged on an opposite side of said lower wall of said cylinder head;
an intake passage communicating at one end thereof to said combustion chamber through said intake valve so that inducted air is fed into said combustion chamber;
an exhaust passage communicating at one end thereof to said combustion chamber through side exhaust valve so that combustion gas in said combustion chamber is exhausted; and
a fuel injection valve arranged for directly injecting fuel into said combustion chamber;
wherein said lower wall of said cylinder head, said lower wall forming an upper wall of said combustion chamber, is configured in the form of a pentroof having an intake-valve-side, tilted, lower wall formed on said one side and an exhaust-valve-side, tilted, lower wall formed on said opposite side,
a spark plug is arranged in a vicinity of a top portion of said pentroof-shaped upper wall of said combustion chamber,
said top wall of said piston forms a lower wall of said combustion chamber, and is configured in the form of a pentroof having an intake-valve-side top wall having a first tilt angle from the cylinder axis and an exhaust-valve-side top wall having a second tilt angle from the cylinder axis, which are formed corresponding to said intake-valve-side, tilted, lower wall and said exhaust-valve-sided, tilted, lower wall, respectively,
said intake-valve-side, tilted, top wall of said top wall of said piston is provided with a recessed portion,
said top wall of said piston has a ridge, said ridge dividing said intake-valve-side, tilted, top wall and said exhaust-valve-side, tilted, top wall from each other, and
said recessed portion is formed extending from said intake-valve-side, tilted, top wall to said exhaust-valve-side, tilted, top wall beyond said ridge.

21. An in-cylinder injection internal combustion engine according to claim 20, wherein said recessed portion is formed as a part of an imaginary spherical surface having a center thereof at a point above said intake-valve-side, tilted, top wall so that said ridge of said piston is included within said imaginary spherical surface.

22. An in-cylinder injection internal combustion engine according to claim 21, wherein, when said piston is located near a top dead center, an injection nozzle of said fuel injection valve and a valve element of said intake valve are both included within said imaginary spherical surface.

23. An in-cylinder injection internal combustion engine comprising:
a combustion chamber including a top and a bottom thereof defined by a lower wall of a cylinder head and a top wall of a piston fittedly inserted within said cylinder;
an intake valve arranged on one side of said lower wall of said cylinder head;
an exhaust valve arranged on an opposite side of said lower wall of said cylinder head;
an intake passage communicating at one end thereof to said combustion chamber through said intake valve so that inducted air is fed into said combustion chamber;
an exhaust passage communicating at one end thereof to said combustion chamber through side exhaust valve so that combustion gas in said combustion chamber is exhausted; and
a fuel injection valve arranged for directly injecting fuel into said combustion chamber;
wherein said lower wall of said cylinder head, said lower wall forming an upper wall of said combustion chamber, is configured in the form of a pentroof having an intake-valve-side, tilted, lower wall formed on said one side and an exhaust-valve-side, tilted, lower wall formed on said opposite side, a spark plug is arranged in a vicinity of a top portion of said pentroof-shaped upper wall of said combustion chamber, said spark plug being arranged with a central axis thereof being tilted toward said opposite side over a predetermined angle relative to a central axis of said cylinder, said top wall of said piston, said top wall forming a lower wall of said combustion chamber, is configured in the form of a pentroof having an intake-valve-side, tilted, top wall and an exhaust-valve-side, tilted, top wall, which are formed corresponding to said intake-valve-side, tilted, lower wall and said exhaust-valve-sided, tilted, lower wall, respectively, and said intake-valve-side, tilted, top wall of said top wall of said piston is provided with a recessed portion.

24. An in-cylinder injection internal combustion engine comprising:

a combustion chamber including a top and a bottom thereof defined by a lower wall of a cylinder head and a top wall of a piston fittedly inserted within said cylinder;

an intake valve arranged on one side of said lower wall of said cylinder head;

an exhaust valve arranged on an opposite side of said lower wall of said cylinder head;

an intake passage communicating at one end thereof to said combustion chamber through said intake valve so that inducted air is fed into said combustion chamber;

an exhaust passage communicating at one end thereof to said combustion chamber through side exhaust valve so that combustion gas in said combustion chamber is exhausted; and a fuel injection valve arranged for directly injecting fuel into said combustion chamber;

wherein said lower wall of said cylinder head, said lower wall forming an upper wall of said combustion chamber, is configured in the form of a pentroof having an intake-valve-side, tilted, lower wall formed on said one side and an exhaust-valve-side, tilted, lower wall formed on said opposite side, a spark plug is arranged in a vicinity of a top portion of said pentroof-shaped upper wall of said combustion chamber, said top wall of said piston, said top wall forming a lower wall of said combustion chamber, is configured in the form of a pentroof having an intake-valve-side, tilted, top wall and an exhaust-valve-side, tilted, top wall, which are formed corresponding to said intake-valve-side, tilted, lower wall and said exhaust-valve-sided, tilted, lower wall, respectively, said intake-valve-side, tilted, top wall of said top wall of said piston is provided with a recessed portion, and when said piston is located near a top dead center, a clearance between said exhaust valve and said exhaust-valve-side, tilted, top wall of said piston at mutually closest portions thereof is set between 5 mm and 8 mm.

25. An in-cylinder injection internal combustion engine comprising:

a combustion chamber including a top and a bottom thereof defined by a lower wall of a cylinder head and a top wall of a piston fittedly inserted within said cylinder;

an intake valve arranged on one side of said lower wall of said cylinder head;

an exhaust valve arranged on an opposite side of said lower wall of said cylinder head;

an intake passage communicating at one end thereof to said combustion chamber through said intake valve so that inducted air is fed into said combustion chamber;

an exhaust passage communicating at one end thereof to said combustion chamber through side exhaust valve so that combustion gas in said combustion chamber is exhausted; and a fuel injection valve arranged for directly injecting fuel into said combustion chamber;

wherein said lower wall of said cylinder head, said lower wall forming an upper wall of said combustion chamber, is configured in the form of a pentroof having an intake-valve-side, tilted, lower wall formed on said one side and an exhaust-valve-side, tilted, lower wall formed on said opposite side, a spark plug is arranged in a vicinity of a top portion of said pentroof-shaped upper wall of said combustion chamber, said top wall of said piston, said top wall forming a lower wall of said combustion chamber, is configured in the form of a pentroof having an intake-valve-side, tilted, top wall and an exhaust-valve-side, tilted, top wall, which are formed corresponding to said intake-valve-side, tilted, lower wall and said exhaust-valve-sided, tilted, lower wall, respectively, said intake-valve-side, tilted, top wall of said top wall of said piston is provided with a recessed portion, and when said piston is located near a top dead center, a distance between said exhaust-valve-side, tilted, lower wall of said cylinder head and said exhaust-valve-side, tilted, top wall of said piston becomes wider toward a center of said combustion chamber, and a flame-propagation space of substantially wedge shape in cross section is formed therebetween.

26. An in-cylinder injection internal combustion engine according to claim 25, wherein said intake-valve-side, tilted, top wall and said exhaust-valve-side, tilted, top wall of said piston are formed at substantially the same inclination and said exhaust-valve-side, tilted, lower wall of said cylinder head is set at an inclination greater than said exhaust-valve-side, tilted, top wall of said piston.

27. An in-cylinder injection internal combustion engine according to claim 25, wherein said intake-valve-side, tilted, lower wall and said exhaust-side, tilted, lower wall of said cylinder head are formed at substantially the same inclination and said exhaust-valve-side, tilted, top wall of said piston is set at an inclination smaller than said exhaust-valve-side, titled, lower wall of said cylinder head.

28. An in-cylinder injection internal combustion engine comprising:

a combustion chamber including a top and a bottom thereof defined by a lower wall of a cylinder head and a top wall of a piston fittedly inserted within said cylinder;

an intake valve arranged on one side of said lower wall of said cylinder head;

an exhaust valve arranged on an opposite side of said lower wall of said cylinder head;

an intake passage communicating at one end thereof to said combustion chamber through said intake valve so that inducted air is fed into said combustion chamber;

an exhaust passage communicating at one end thereof to said combustion chamber through side exhaust valve so that combustion gas in said combustion chamber is exhausted; and a fuel injection valve arranged for directly injecting fuel into said combustion chamber;

wherein said lower wall of said cylinder head, said lower wall forming an upper wall of said combustion chamber, is configured in the form of a pentroof having an intake-valve-side, tilted, lower wall formed on said one side and an exhaust-valve-side, tilted, lower wall formed on said opposite side, a spark plug is arranged in a vicinity of a top portion of said pentroof-shaped upper wall of said combustion chamber, said top wall of said piston, said top wall forming a lower wall of said combustion chamber, is configured in the form of a pentroof having an intake-valve-side, tilted, top wall and an exhaust-valve-side, tilted, top wall, which are formed corresponding to said intake-valve-side, tilted, lower wall and said exhaust-valve-sided, tilted, lower wall, respectively, and said intake-valve-side, tilted, top wall of said top wall of said piston is provided with a recessed portion, and when said piston is located near a top dead center, a ratio of a volume between an inner wall of said recessed portion and said lower wall of said cylinder head over said recessed portion to a total volume of said combustion chamber is at 0.4 to 0.6.

* * * * *

UNITED STATES PATENT AND TRADEMARK OFFICE
CERTIFICATE OF CORRECTION

PATENT NO. : 5,806,482
DATED : Sept. 15, 1998
INVENTOR(S) : Igarashi et al.

It is certified that error appears in the above-identified patent and that said Letters Patent is hereby corrected as shown below:

Please insert the Foreign Application Priority Data as follows:

-- [30] Foreign Application Priority Data

March 28, 1995 [JP] Japan ................... 7-069815

May 16, 1995 [JP] Japan ....................... 7-117555

Sept. 11, 1995 [JP] Japan ..................... 7-233129 --

Signed and Sealed this

Eighth Day of February, 2000

Attest:

Q. TODD DICKINSON

*Attesting Officer*     *Commissioner of Patents and Trademarks*